(12) United States Patent
Chen et al.

(10) Patent No.: US 10,908,789 B2
(45) Date of Patent: Feb. 2, 2021

(54) APPLICATION SWITCHING METHOD AND APPARATUS AND GRAPHICAL USER INTERFACE

(71) Applicant: Huawei Technologies Co., Ltd., Shenzhen (CN)

(72) Inventors: Jian Chen, Hangzhou (CN); Simon Ekstrand, Lund (SE); Fredrik Andreasson, Lund (SE); Tizheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/457,115

(22) Filed: Jun. 28, 2019

(65) Prior Publication Data

US 2019/0324615 A1 Oct. 24, 2019

Related U.S. Application Data

(63) Continuation of application No. PCT/CN2017/094557, filed on Jul. 26, 2017.

(30) Foreign Application Priority Data

Dec. 30, 2016 (CN) .......................... 2016 1 1263072

(51) Int. Cl.
  *G06F 3/0488* (2013.01)
  *G06F 3/0484* (2013.01)
  *G06F 3/0481* (2013.01)

(52) U.S. Cl.
  CPC .......... *G06F 3/0484* (2013.01); *G06F 3/0481* (2013.01); *G06F 3/0488* (2013.01); *G06F 3/04845* (2013.01)

(58) Field of Classification Search
  CPC .. G06F 3/04883; G06F 3/0481; G06F 3/0488; G06F 3/04886; G06F 2203/04806;
  (Continued)

(56) References Cited

U.S. PATENT DOCUMENTS 8,527,873 B2 9/2013 Braun et al.
8,928,581 B2 1/2015 Braun et al.
(Continued)

FOREIGN PATENT DOCUMENTS

CN 105094618 A 11/2015
CN 105335224 A 2/2016
(Continued)

OTHER PUBLICATIONS

CN/201611263072.0, Office Action, dated Jan. 15, 2020.
Korean Office Action issued in Korean Application No. 10-2019-7022068 dated Aug. 24, 2020.

*Primary Examiner* — Di Xiao

(57) ABSTRACT

The present disclosure relates to the field of electronic devices and provides an application switching method, apparatus, and a graphical user interface to resolve a problem that multi-task switching has a relatively high requirement on the hardware of an electronic device. The application switching method includes: detecting a touch pressure value that is generated by a touch operation when a target region of a touchscreen is touched; when detecting that the touch pressure value is greater than a preset threshold, generating a first display window in a current display interface of an electronic device, and presenting a first application in the first display window according to a preset rule; and switching the current display interface to a display interface of the first application if detecting an enable signal for the first application, where the current display interface is different from the display interface of the first application.

20 Claims, 29 Drawing Sheets

(58) Field of Classification Search
CPC ......... G06F 2203/04808; G06F 3/0416; G06F 3/0485; G06F 3/0486; G06F 3/0412; G06F 3/044; G06F 3/0482; G06F 3/04842; G06F 21/31; G06F 1/1677; G06F 2203/04803; G06F 1/1647; G06F 21/32; G06F 21/40; G06F 2200/1614; G06F 3/0346; G06F 3/04812; G06F 3/04817; G06F 3/04845; G06F 3/1431; G06F 9/451; G06F 1/1626; G06F 1/1652; G06F 1/1694; G06F 1/3265; G06F 2200/1637; G06F 3/017; G06F 3/0237; G06F 3/03545; G06F 3/048; G06F 3/0483; G06F 3/0484; G06F 3/1454; G06F 40/232; G06F 9/5061; G06F 11/0778; G06F 11/26; G06F 11/3037; G06F 11/323; G06F 11/3409; G06F 11/3466; G06F 11/3476; G06F 11/348; G06F 11/349; G06F 1/16; G06F 1/1601; G06F 1/1616; G06F 1/1618; G06F 1/163; G06F 1/1632; G06F 1/1641; G06F 1/1656; G06F 1/1662; G06F 1/169; G06F 1/3218; G06F 1/3287; G06F 21/608; G06F 2201/81; G06F 2203/04108; G06F 2203/04801; G06F 3/01; G06F 3/0202; G06F 3/0227; G06F 3/0236; G06F 3/041; G06F 3/0436; G06F 3/04847; G06F 3/1222; G06F 3/1238; G06F 3/1255; G06F 3/1423; G06F 3/1438; G06F 3/1446; G06F 40/106; G06F 40/114; G06F 9/45512; G06F 16/10; G06F 16/35; G06F 1/1643; G06F 1/3228; G06F 2203/04804; G06F 3/0383; G06F 3/04855; G06F 3/14; G06F 40/284; G06F 8/38

See application file for complete search history.

(56) References Cited

U.S. PATENT DOCUMENTS

| | | | | |
|---|---|---|---|---|
| 2013/0300684 | A1* | 11/2013 | Kim | G06F 3/0488 345/173 |
| 2015/0121263 | A1* | 4/2015 | Yeh | G06F 3/0482 715/765 |
| 2015/0143299 | A1* | 5/2015 | Kim | G06F 3/0482 715/835 |
| 2015/0277756 | A1* | 10/2015 | Kim | G06F 1/3228 455/566 |
| 2016/0154536 | A1* | 6/2016 | Kim | G06F 3/04845 715/768 |
| 2016/0259413 | A1* | 9/2016 | Anzures | G06F 3/016 |
| 2017/0061932 | A1* | 3/2017 | Kwon | G06F 1/1626 |

FOREIGN PATENT DOCUMENTS

| | | |
|---|---|---|
| CN | 105511781 A | 4/2016 |
| CN | 105607793 A | 5/2016 |
| CN | 105630308 A | 6/2016 |
| CN | 105930077 A | 9/2016 |
| CN | 105955639 A | 9/2016 |
| CN | 106155480 A | 11/2016 |
| CN | 106775420 A | 5/2017 |
| KR | 20120089919 A | 8/2012 |
| KR | 20150057341 A | 5/2015 |
| KR | 20150075011 A | 7/2015 |
| KR | 20150114291 A | 10/2015 |

* cited by examiner

APPLICATION SWITCHING METHOD AND APPARATUS AND GRAPHICAL USER INTERFACE

CROSS-REFERENCE TO RELATED APPLICATIONS

This application is a continuation of International Application No. PCT/CN2017/094557, filed on Jul. 26, 2017, which claims priority to Chinese Patent Application No. 201611263072.0, filed on Dec. 30, 2016. The disclosures of the aforementioned applications are hereby incorporated by reference in their entireties.

TECHNICAL FIELD

Embodiments of the present disclosure relate to the field of electronic devices, and in particular, to an application switching method and apparatus and a graphical user interface.

BACKGROUND

With rapid development of electronic devices (for example, mobile phones and tablet computers), an increasing quantity of electronic devices have a multi-task switching capability. The term "multi-task" may be understood as a plurality of programs or processes, and each task may be of a foreground type or background type. The foreground task is a task that is running at a current moment and has an interface that can be seen by a user. The background task is a task that is running and has an interface that cannot be seen by a user at a current moment. During "multi-task switching", a background task of an electronic device is switched to foreground, so that a user can see a task interface of the task; and if a task is running in foreground, the foreground task is correspondingly switched to background.

In the prior art, an electronic device usually implements multi-task switching by using the following method. After the electronic device detects a double-tap operation gesture or a tap operation gesture on a function button (e.g., a home button based on an iOS operating system or a multi-tasking menu button based on an Android® operating system) of the electronic device, the electronic device displays, in a current display interface, a task switching list including at least one background task or process task. Moreover, after detecting a first touch input operation on the task switching list, the electronic device displays, in the current display interface of the electronic device, an interface of a task or process selected by the first touch input operation.

However, the multi-task switching method provided in the prior art has a relatively high requirement on hardware of an electronic device. For example, the electronic device needs to be equipped with a physical home button or a multitasking menu button (which may be unavailable in a non-Android system). In addition, as the task switching can switch only a task running in background to foreground, it may not apply to all cases.

SUMMARY

Embodiments of the present disclosure provide an application switching method, apparatus, and a graphical user interface to resolve a prior-art problem that multi-task switching has a relatively high requirement on hardware of an electronic device and a limitation that only a background task can be switched.

To achieve the foregoing objective, the following technical solutions are used in the embodiments of the present disclosure.

According to a first aspect, an embodiment of the present disclosure provides an application switching method, applied to an electronic device with a touchscreen. The method provided in this embodiment of the present disclosure includes: detecting a touch pressure value that is generated by a touch operation when a target region of the touchscreen is touched; when detecting that the touch pressure value is greater than a preset threshold, generating a first display window in a current display interface of the electronic device, and presenting a first application in the first display window according to a preset rule; and switching the current display interface to a display interface of the first application if detecting an enable signal for the first application, where the current display interface is different from the display interface of the first application.

In the application switching method provided in this embodiment of the present disclosure, the touch pressure value generated by the touch operation in the target region is detected, and when the touch pressure value is greater than the preset threshold, the first display window is generated in the current display interface of the electronic device, to present the first application in the first display window, for a user to "preview" the first application. Because the application switching method provided in this embodiment of the present disclosure is based on the touch pressure value that is generated by the touch operation when the target region on the touchscreen is touched, according to the method provided in this embodiment of the present disclosure, the first application can be previewed in a display window (e.g., the first display window) in the current display interface without a home button or a multifunctional menu button of the electronic device. The method has a relatively low requirement on hardware of the electronic device.

With reference to the first aspect, in a first possible implementation of the first aspect, the generating a first display window in a current display interface of the electronic device, and presenting a first application in the first display window according to a preset rule includes: obtaining a preset priority of each of at least one application that is running in the electronic device; and determining an application with a highest preset priority in the at least one application as the first application based on the preset priority of each application.

With reference to the first aspect or the first possible implementation of the first aspect, in a second possible implementation of the first aspect, the obtaining a preset priority of each of at least one application that is running in the electronic device includes: determining the preset priority of each application based on a basic attribute of each application, where the basic attribute of the application includes at least one of a use time of the application, a time point at which the application is installed, frequency of using the application, a time point at which the application is updated, a rank based on an initial of a name of the application, a memory space size occupied by the application when the application runs in the electronic device, a size of the application, a rank of an operating position at which the application is located on the electronic device, a color similarity of an icon corresponding to the application, or a color similarity of a display interface corresponding to the application.

With reference to any possible implementation of the first aspect, in a third possible implementation of the first aspect, if the current display interface is a display interface of a third application, the generating a first display window in a current display interface of the electronic device, and presenting a first application in the first display window according to a preset rule includes: obtaining a category to which each of at least one application that is running in the electronic device belongs; determining a target category from the category to which each application belongs, where the target category is the same as a category of the third application, and the target category includes one or more applications; and determining an application with a highest preset priority in the one or more applications as the first application. In this way, through association with a category to which the current display interface belongs, an application with a highest preset priority in applications belonging to the same category can be displayed in the first display window.

With reference to any possible implementation of the first aspect, in a fourth possible implementation of the first aspect, the method provided in this embodiment of the present disclosure further includes: when the first application is presented in the first display window according to the preset rule, presenting, in the first display window, another application that is other than the first application and that is in the at least one application that is running in the electronic device. In this way, each application that is running in the electronic device can be previewed in the current display interface.

With reference to any possible implementation of the first aspect, in a fifth possible implementation of the first aspect, the method provided in this embodiment of the present disclosure further includes: if detecting a non-enable signal corresponding to the first application, generating a second display window in the current display interface, and presenting a second application in the second display window according to the preset rule, where a preset priority of the second application is lower than a preset priority of the first application.

With reference to any possible implementation of the first aspect, in a sixth possible implementation of the first aspect, the method provided in this embodiment of the present disclosure further includes: switching the current display interface to a display interface of the second application if detecting an enable signal corresponding to the second application.

With reference to any possible implementation of the first aspect, in a seventh possible implementation of the first aspect, the switching the current display interface to a display interface of the first application if detecting an enable signal for the first application includes: if detecting that a touch location of the touch operation moves to a target location, and the touch operation is released from the touchscreen, controlling the first display window to be enlarged until the first display window totally covers the current display interface, and covering the current display interface by using the display interface corresponding to the first application displayed in the first display window.

With reference to any possible implementation of the first aspect, in an eighth possible implementation of the first aspect, the method provided in this embodiment of the present disclosure further includes: detecting a quantity of press times that is generated by the touch operation in the first display window, where the quantity of press times is a quantity of times that the touch pressure value generated by the touch operation is greater than the preset threshold; and if determining that the quantity of press times reaches a preset times threshold, generating a third display window in the current display interface, and presenting a fourth application in the third display window according to the preset rule, where a preset priority of the fourth application is lower than a preset priority of an application displayed in a last display window that is generated in the current display interface before the preset times threshold is reached.

With reference to any possible implementation of the first aspect, in a ninth possible implementation of the first aspect, before the switching the current display interface to a display interface of the first application if detecting an enable signal for the first application, the method provided in this embodiment of the present disclosure further includes: detecting movement, on the touchscreen, of a touch location of the touch operation; and controlling the first display window to move on the touchscreen, and controlling an area of the first display window to be enlarged until the display interface of the application presented in the first display window totally covers the current display interface.

With reference to any possible implementation of the first aspect, in a tenth possible implementation of the first aspect, the controlling the first display window to move on the touchscreen includes: covering, along a movement direction of the first display window by using the application displayed in the first display window, an interface element that is of the current display interface and that is covered when the first display window moves; and re-displaying, along a direction reverse to the movement direction of the first display window, an interface element that is of the current display interface and that is covered by the first display window before the first display window moves.

With reference to any possible implementation of the first aspect, in an eleventh possible implementation of the first aspect, the second display window provided in this embodiment of the present disclosure is located in the first display window, or the second display window covers the first display window, or the second display window is located in another region in the current display interface other than the first display window.

With reference to any possible implementation of the first aspect, in a twelfth possible implementation of the first aspect, the method provided in this embodiment of the present disclosure further includes: controlling the area of the first display window to change with a change of the touch pressure value.

With reference to any possible implementation of the first aspect, in a thirteenth possible implementation of the first aspect, each of the first application, the second application, the third application, or other applications provided in this embodiment of the present disclosure is displayed in the first display window in a form of an icon, or the first application is displayed in the first display window in a form of the display interface corresponding to the first application, the second application is displayed in the first display window in a form of the display interface corresponding to the second application, the third application is displayed in the first display window in a form of the display interface corresponding to the third application, or each of the other applications is displayed in the first display window in a form of a display interface corresponding to the application.

With reference to any possible implementation of the first aspect, in a fourteenth possible implementation of the first aspect, the method provided in this embodiment of the present disclosure further includes: if detecting that the touch operation is released from the touchscreen, controlling the first display window to disappear from the current display interface when the touch operation is released from the touchscreen or after the touch operation is released from the touchscreen a preset time.

With reference to any possible implementation of the first aspect, in a fifteenth possible implementation of the first aspect, the method provided in this embodiment of the present disclosure further includes: generating a first closed region based on the touch location, where an area of the first closed region changes with a change of the touch pressure value, and the first closed region includes an interface element that is located in the first closed region and that is of the current display interface; gradually increasing the area of the first closed region based on the touch pressure value; and controlling the interface element that is located in the first closed region and that is of the current display interface to disappear, to generate the first display window.

According to a second aspect, an embodiment of the present disclosure provides an application switching apparatus, applied to an electronic device with a touchscreen. The apparatus provided in this embodiment of the present disclosure includes: a detection unit, configured to detect a touch pressure value that is generated by a touch operation when a target region of the touchscreen is touched; a responding unit, configured to: when it is detected that the touch pressure value is greater than a preset threshold, generate a first display window in a current display interface of the electronic device, and present a first application in the first display window according to a preset rule; and a switching unit, configured to switch the current display interface to a display interface of the first application if an enable signal for the first application is detected, where the current display interface is different from the display interface of the first application.

With reference to the second aspect, in a first possible implementation of the second aspect, the responding unit includes: an obtaining module, configured to obtain a preset priority of each of at least one application that is running in the electronic device; and a determining module, configured to determine an application with a highest preset priority in the at least one application as the first application based on the preset priority of each application.

With reference to any possible implementation of the second aspect, in a second possible implementation of the second aspect, the obtaining module is specifically configured to determine the preset priority of each application based on a basic attribute of each application, where the basic attribute of the application includes at least one of a use time of the application, a time point at which the application is installed, frequency of using the application, a time point at which the application is updated, a rank based on an initial of a name of the application, a memory space size occupied by the application when the application runs in the electronic device, a size of the application, a rank of an operating position at which the application is located on the electronic device, a color similarity of an icon corresponding to the application, or a color similarity of a display interface corresponding to the application.

With reference to any possible implementation of the second aspect, in a third possible implementation of the second aspect, if the current display interface is a display interface of a third application, the responding unit is specifically configured to: obtain a category to which each of at least one application that is running in the electronic device belongs; determine a target category from the category to which each application belongs, where the target category is the same as a category of the third application, and the target category includes one or more applications; and determine an application with a highest preset priority in the one or more applications as the first application.

With reference to any possible implementation of the second aspect, in a fourth possible implementation of the second aspect, the responding unit is further configured to: when the first application is presented in the first display window according to the preset rule, present, in the first display window, another application that is other than the first application and that is in the at least one application that is running in the electronic device.

With reference to any possible implementation of the second aspect, in a fifth possible implementation of the second aspect, the responding unit is further configured to: if a non-enable signal corresponding to the first application is detected, generate a second display window in the current display interface, and present a second application in the second display window according to the preset rule, where a preset priority of the second application is lower than a preset priority of the first application.

With reference to any possible implementation of the second aspect, in a sixth possible implementation of the second aspect, the switching unit is further configured to switch the current display interface to a display interface of the second application if an enable signal corresponding to the second application is detected.

With reference to any possible implementation of the second aspect, in a seventh possible implementation of the second aspect, the switching unit is specifically configured to: if it is detected that a touch location of the touch operation moves to a target location, and the touch operation is released from the touchscreen, control the first display window to be enlarged until the first display window totally covers the current display interface, and cover the current display interface by using the display interface corresponding to the first application displayed in the first display window.

With reference to any possible implementation of the second aspect, in an eighth possible implementation of the second aspect, the detection unit is further configured to detect a quantity of press times that is generated by the touch operation in the first display window, where the quantity of press times is a quantity of times that the touch pressure value generated by the touch operation is greater than the preset threshold; and the responding unit is further configured to: if it is determined that the quantity of press times reaches a preset times threshold, generate a third display window in the current display interface, and present a fourth application in the third display window according to the preset rule, where a preset priority of the fourth application is lower than a preset priority of an application displayed in a last display window that is generated in the current display interface before the preset times threshold is reached.

With reference to any possible implementation of the second aspect, in a ninth possible implementation of the second aspect, the detection unit provided in this embodiment of the present disclosure is further configured to detect movement, on the touchscreen, of a touch location of the touch operation; and the responding unit is configured to control the first display window to move on the touchscreen, and control an area of the first display window to be enlarged until the display interface of the application presented in the first display window totally covers the current display interface.

With reference to any possible implementation of the second aspect, in a tenth possible implementation of the second aspect, the responding unit is specifically configured to cover, along a movement direction of the first display window by using the application displayed in the first display window, an interface element that is of the current display interface and that is covered when the first display window moves; and re-display, along a direction reverse to the movement direction of the first display window, an interface element that is of the current display interface and that is covered by the first display window before the first display window moves.

According to a third aspect, an embodiment of the present disclosure provides an electronic device. The electronic device includes a touchscreen, one or more processors, a memory, and one or more programs, the one or more programs are stored in the memory and configured to be executed by the one or more processors, the one or more processors read the one or more programs stored in the memory, to perform the application switching method described in any possible implementation of the first aspect to the thirteenth possible implementation of the first aspect.

According to a fourth aspect, an embodiment of the present disclosure provides a graphical user interface on an electronic device with a touchscreen. The electronic device includes the touchscreen, a memory, and one or more processors configured to execute one or more programs stored in the memory, and the graphical user interface includes a current display interface and a first display window. The current display interface is displayed in response to detected triggering of a user on the touchscreen of the electronic device. In response to a touch pressure value that is generated when a target region of the touchscreen is touched by a touch operation of the user, when the touch pressure value is greater than a preset threshold, the first display window is displayed in the current display interface, and a first application is presented in the first display window.

With reference to the fourth aspect, in a first possible implementation of the fourth aspect, the graphical user interface provided in this embodiment of the present disclosure further includes a second display window and a second application. In response to a non-enable signal corresponding to the first application, the second display window is displayed in the current display interface, and the second application is presented in the second display window. A preset priority of the second application is lower than a preset priority of the first application.

With reference to the fourth aspect or the first possible implementation of the fourth aspect, in a second possible implementation of the fourth aspect, the graphical user interface provided in this embodiment of the present disclosure further includes a third display window and a third application. In response to a quantity of press times that is generated by the touch operation in the first display window, when the quantity of press times reaches a preset times threshold, the third display window is displayed in the current display interface, and the third application is presented in the third display window. The quantity of press times is a quantity of times that the touch pressure value generated by the touch operation is greater than the preset threshold, and a preset priority of the third application is lower than a preset priority of a last application displayed in the first display window before the preset times threshold is reached.

According to a fifth aspect, an embodiment of the present disclosure provides a computer-readable storage medium, configured to store one or more computer programs. The one or more computer programs include program code, and when the computer program runs on a computer, the program code is used to perform the application switching method described in any possible implementation of the first aspect to the thirteenth possible implementation of the first aspect.

DESCRIPTION OF EMBODIMENTS

The following describes embodiments of the present disclosure with reference to the accompanying drawings.

To facilitate clear description of technical solutions of the embodiments of the present disclosure, in the embodiments of the present disclosure, words such as "first" and "second" are used to distinguish between same or similar items whose functions and purposes are substantially the same, and a person skilled in the art may understand that the words such as "first" and "second" do not limit a quantity or an execution order.

Figure 1:
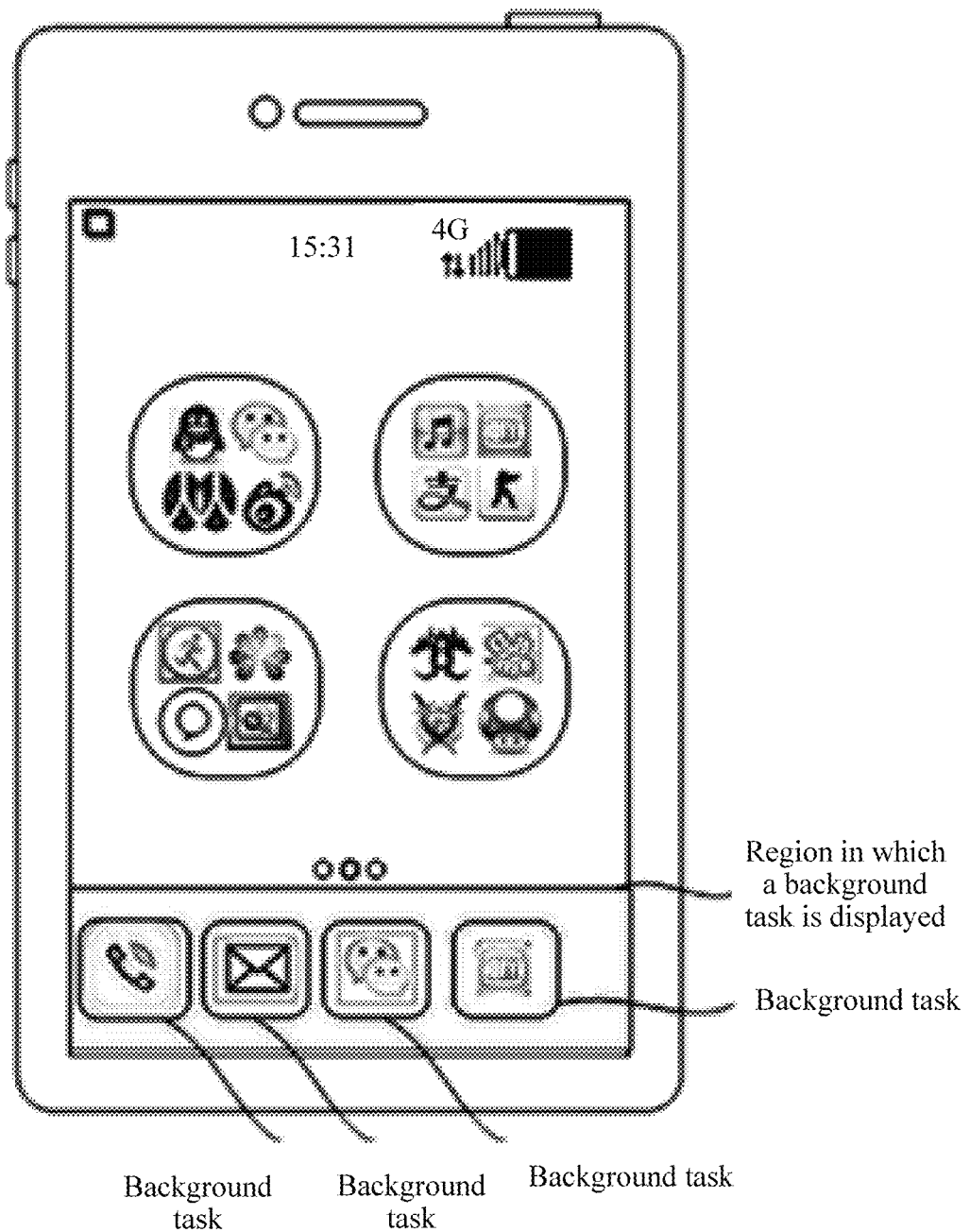
FIG. 1 is a schematic diagram of a common multi-task switching scenario according to the prior art.

FIG. 1 is a diagram of a common multi-task switching scenario. For example, when needing to switch at least one background task running in a background of an electronic device to a foreground of the electronic device, a user usually needs to perform a triggering operation on a multi-tasking menu function button or a home button of the electronic device, to display, in a region of a display taskbar of the electronic device, the at least one background task running in the background of the electronic device. Then, the user selects a background task from the at least one background task by performing an operation in the region of the display taskbar, and switches the background task to the foreground of the electronic device. On one hand, because the electronic device needs to have the multitasking menu function button or the home button, a requirement on hardware of the electronic device is relatively high. On the other hand, switching requires a plurality of times of interaction between the electronic device and user operations, and consequently, efficiency of a processor in the electronic device is reduced. In the embodiments of the present disclosure, in combination with a pressure sensing technology, a first application can be displayed in a region (for example, a first display window) in a current display interface of an electronic device according to a preset rule when a touch parameter of a touch operation meets a triggering pressure threshold, to provide a "preview" of the first application by using the first display window, and if an enable signal is detected after the "preview", the current display interface is switched to a display interface of the first application. According to the method, the first application can be "previewed" when the electronic device does not support a home function button or a multitasking menu function button, and after the "preview", the display interface can be switched, that is, the current display interface can be switched to the display interface of the first application.

The electronic device provided in the embodiments of the present disclosure may be any electronic device with a touchscreen or a touch panel, for example, a mobile phone, a mobile computer, a tablet computer, a personal digital assistant (Personal Digital Assistant, PDA), a media player, a smart TV, a smart wearable device (for example, a smartwatch, smart glasses, or a smart band), an e-reader, a handheld game console, a POS (Point of Sales, point of sales), an in-vehicle electronic device (an in-vehicle computer), or the like. The electronic device supports a plurality of applications, for example, an application program installed on the electronic device, or a display interface corresponding to a process opened by any application program. A user may interact with the applications by touching the touchscreen or the touch panel.

In the embodiments of the present disclosure, the user may touch the touchscreen or the touch panel by any means or accessory such as a stylus or a finger, to implement interaction.

The touch operation in the embodiments of the present disclosure may be directly touching a target region of the touchscreen of the electronic device by using a finger of the user or any means or accessory such as a stylus with a touch pressure value generated in the target region, or may be touching the touchscreen of the electronic device or touching the touchscreen of the electronic device within a preset range after the touch pressure value reaches a preset threshold. The preset range is a range within which the touchscreen of the electronic device can detect a touch operation of a finger or any means or accessory such as a stylus.

Figure 2:
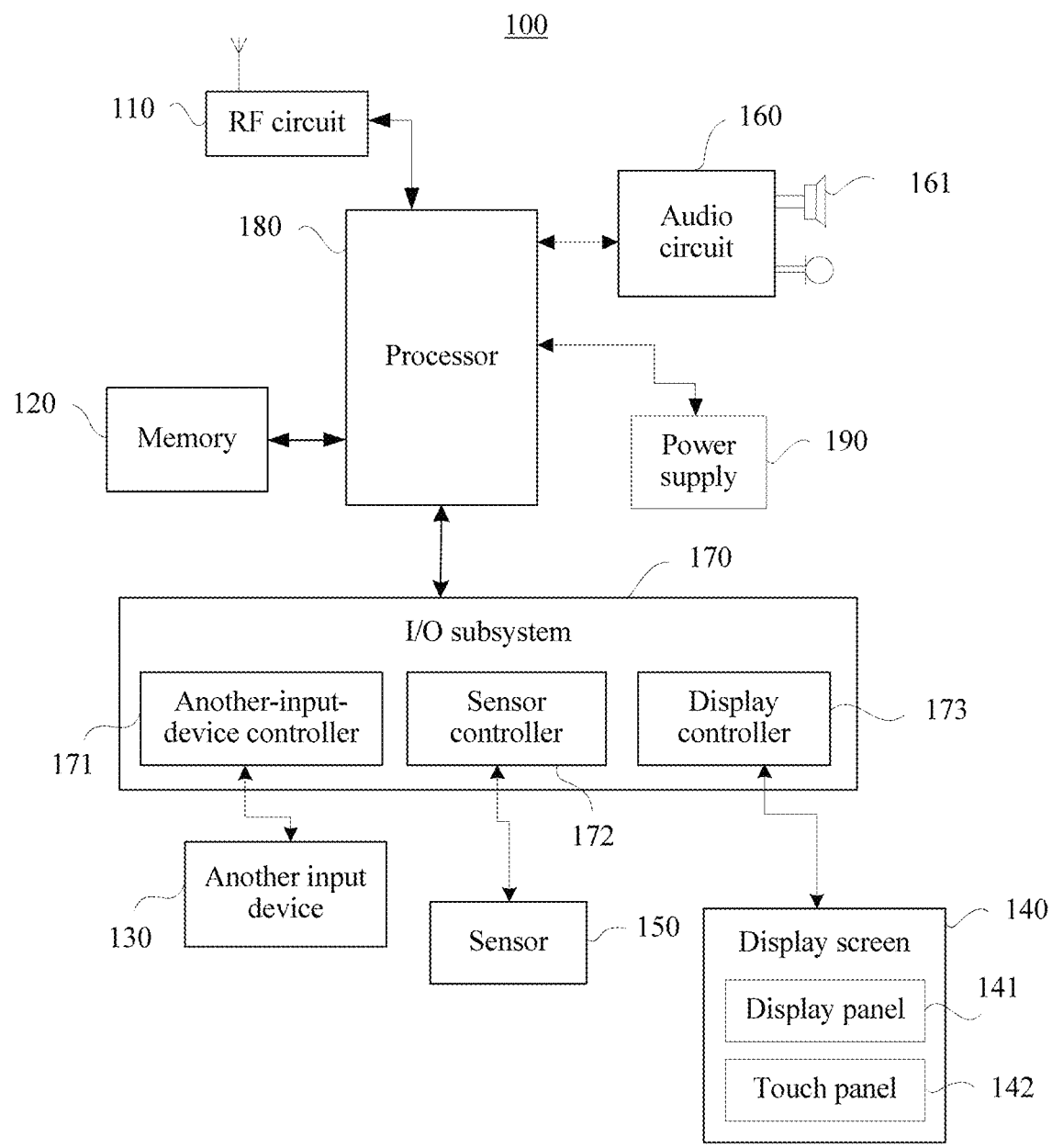
FIG. 2 is a schematic structural diagram of a mobile phone according to an embodiment of the present disclosure.

For example, the electronic device is a mobile phone. FIG. 2 is a block diagram of a partial structure of a mobile phone 100 related to the embodiments of the present disclosure. Referring to FIG. 2, the mobile phone 100 includes components such as an RF (Radio Frequency) circuit 110, a memory 120, another input device 130, a display screen 140, a sensor 150, an audio circuit 160, an I/O (Input/Output) subsystem 170, a processor 180, and a power supply 190. A person skilled in the art may understand that the mobile phone structure shown in FIG. 2 does not constitute a limitation on the mobile phone, and the mobile phone may include more or fewer components than those shown in the figure. For example, some components may be combined, some components may be split, or a component may be deployed differently than shown in FIG. 2. A person skilled in the art may understand that the display screen 140 belongs to a user interface (UI), and the mobile phone 100 may include more or fewer user interfaces than those shown in the figure. The following specifically describes the components of the mobile phone 100 with reference to FIG. 2:

The RF circuit 110 may be configured to receive and send signals in information receiving and sending processes or call processes. Particularly, the RF circuit 110 receives downlink information from a base station, then delivers the downlink information to the processor 180 for processing, and sends related uplink data to the base station. Generally, the RF circuit includes but is not limited to an antenna, at least one amplifier, a transceiver, a coupler, an LNA (Low Noise Amplifier), a duplexer, and the like. In addition, the RF circuit 110 may further communicate with a network and another device through wireless communication. The wireless communication may use any communications standard or protocol, including but not limited to GSM (Global System for Mobile Communications, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Message Service, short message service), and the like.

The memory 120 may be configured to store a software program and module. The processor 180 runs the software program and module stored in the memory 120, to implement various functional applications of the mobile phone 100 and data processing. The memory 120 may mainly include a program storage area and a data storage area. The program storage area may store an operating system, an application program required by at least one function (for example, a sound playing function or an image playing function), and the like. The data storage area may store data (e.g., audio data or an address book) created based on use of the mobile phone 100, and the like. In addition, the memory 120 may include a high speed random access memory, and may further include a non-volatile memory, for example, at least one magnetic disk storage device, a flash memory, or another volatile solid state storage device.

The another input device 130 may be configured to receive entered digit or character information, and generate a key signal input related to user setting and function control of the mobile phone 100. Specifically, the another input device 130 may include but is not limited to one or more of a physical keyboard, a function button (for example, a volume control button or a switch button), a trackball, a mouse, a joystick, an optical mouse (the optical mouse is a touch-sensitive surface that does not display a visual output, or an extension of a touch-sensitive surface formed by a touchscreen), and the like. The another input device 130 is connected to an another-input-device controller 171 of the I/O subsystem 170, and exchanges signals with the processor 180 under control of the another-input-device controller 171.

The display screen 140 may be configured to display information entered by a user or information provided for a user, and various menus of the mobile phone 100, and may further accept entering of the user. Specifically, the display screen 140 may include a display panel 141 and a touch panel 142. The display panel 141 may be configured by using an LCD (Liquid Crystal Display), an OLED (Organic Light-Emitting Diode), or the like. The touch panel 142, also referred to as a touchscreen or a touch-sensitive screen, can collect a touch or touchless operation of the user on or near the touch panel 142 (e.g., an operation of the user on the touch panel 142 or near the touch panel 142 by using any suitable object or accessory such as a finger or a stylus, or a motion sensing operation, where the operation includes an operation type such as a single point control operation or a multipoint control operation), and drive a corresponding connection apparatus based on a preset program. Optionally, the touch panel 142 may include two parts: a touch detection apparatus and a touch controller. The touch detection apparatus detects a touch orientation and posture of the user, detects a signal generated by an entering operation, and transfers the signal to the touch controller. The touch controller receives touch information from the touch detection apparatus, converts the touch information into information that can be processed by the processor, and sends the information to the processor 180. Moreover, the touch controller can receive and execute a command sent by the processor 180. In addition, the touch panel 142 may be implemented as resistive, capacitive, infrared, surface acoustic wave, or other types of touch panels, or the touch panel 142 may be implemented by using any technology developed in the future. Further, the touch panel 142 may cover the display panel 141, and the user may perform, based on content displayed by the display panel 141 (e.g., where the displayed content includes but is not limited to a soft keyboard, a virtual mouse, a virtual button, an icon, or the like), an operation on or near the touch panel 142 covering the display panel 141. After detecting the operation on or near the touch panel 142, the touch panel 142 transfers the operation to the processor 180 by using the I/O subsystem 170, to determine a user input. Then, the processor 180 provides a corresponding visual output on the display panel 141 based on the user input by using the I/O subsystem 170. Although in FIG. 1, the touch panel 142 and the display panel 141 implement input and output functions of the mobile phone 100 as two separate parts, in some embodiments, the touch panel 142 and the display panel 141 may be integrated to implement the input and output functions of the mobile phone 100.

The mobile phone 100 may further include at least one sensor 150, for example, an optical sensor, a motion sensor, and other sensors. Specifically, the optical sensor may include an ambient light sensor and a proximity sensor. The ambient light sensor may adjust luminance of the display panel 141 based on brightness of ambient light. The proximity sensor may switch off the display panel 141 and/or backlight when the mobile phone 100 is moved to an ear. As a type of motion sensor, an acceleration sensor may detect magnitude of accelerations in various directions (generally on three axes), may detect magnitude and a direction of gravity when static, and may be applied to an application that recognizes attitude of the mobile phone (e.g., switching between landscape orientation and portrait orientation, a related game, and magnetometer attitude calibration), a function related to vibration recognition (e.g., a pedometer or a knock), and the like. Other sensors such as a gyroscope, a barometer, a hygrometer, a thermometer, and an infrared sensor that may also be configured on the mobile phone 100 are not further described herein.

The audio circuit 160, a speaker 161, and a microphone 162 may provide audio interfaces between the user and the mobile phone 100. The audio circuit 160 may convert received audio data into a signal and transmit the signal to the speaker 161, and the speaker 161 converts the signal into a sound signal and output the sound signal. In addition, the microphone 162 converts a collected sound signal into a signal, and the audio circuit 160 receives the signal and converts the signal into audio data, and outputs the audio data to the RF circuit 108 to send the audio data to, for example, another mobile phone, or outputs the audio data to the memory 120 for further processing.

The I/O subsystem 170 is configured to detect external input and output devices, and may include the another-input-device controller 171, a sensor controller 172, and a display controller 173. Optionally, one or more another-input-device controllers 171 receive signals from the another input device 130 and/or send signals to the another input device 130. The another input control device 130 may include a physical button (e.g., a push button, a rocker button, or the like), a dial, a slide switch, a joystick, a click wheel, or an optical mouse (e.g., a touch-sensitive surface that does not display a visual output, or an extension of a touch-sensitive surface formed by a touchscreen). It should be noted that the another-input-device controller 171 may be connected to any one or more of the foregoing devices. The display controller 173 in the I/O subsystem 170 receives a signal from the display screen 140 and/or sends a signal to the display screen 140. After the display screen 140 detects the user input, the display controller 173 converts the detected user input into interaction corresponding to a user interface displayed on the display screen 140, to implement human computer interaction. The sensor controller 172 may receive signals from one or more sensors 150 and/or send signals to one or more sensors 150.

The processor 180 is a control center of the mobile phone 100, and is connected to various parts of the mobile phone by using various interfaces and lines. By running or executing the software program and/or module stored in the memory 120, and invoking data stored in the memory 120, the processor 180 performs various functions of the mobile phone 100 and data processing, to perform overall monitoring on the mobile phone. Optionally, the processor 180 may include one or more processing units. The processor 180 may be integrated with an application processor and a modem processor. The application processor mainly processes an operating system, a user interface, an application program, and the like. The modem processor mainly processes wireless communication. It may be understood that the modem processor may alternatively not be integrated into the processor 180.

The mobile phone 100 further includes the power supply 190 (e.g., a battery) for supplying power to the components. Preferably, the power supply 190 may be logically connected to the processor 180 by using a power management system, to implement functions such as charging, discharging, and power consumption management by using the power management system. Although not shown, the mobile phone 100 may further include a camera, a Wi-Fi module, a Bluetooth module, and the like. Details are not further described herein.

An application switching method provided in the embodiments of the present disclosure may be performed by using the mobile phone shown in FIG. 2.

Figure 3:
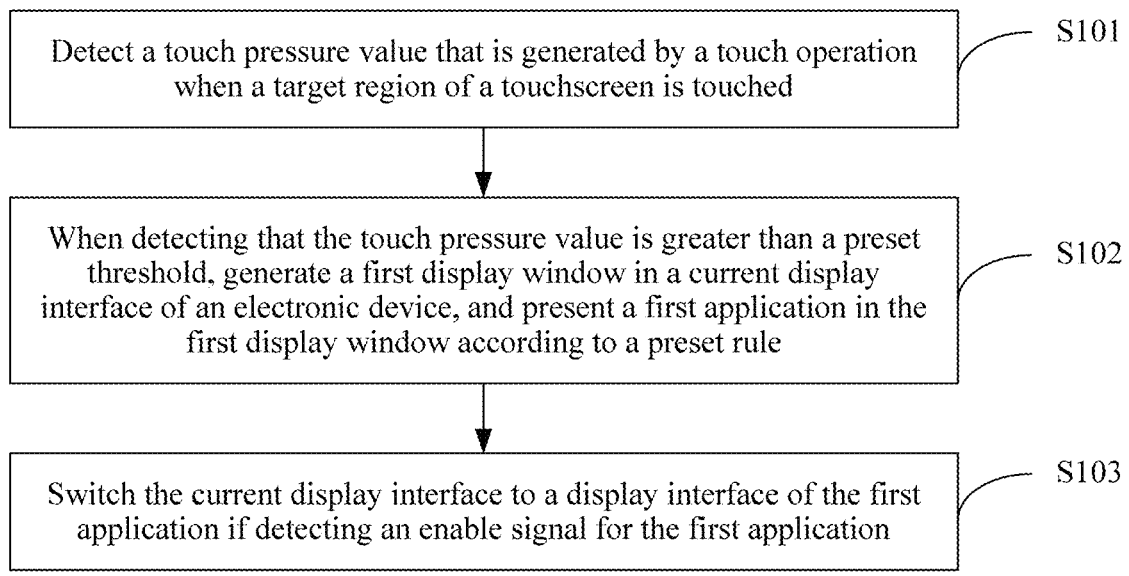
FIG. 3 is a schematic flowchart 1 of an application switching method according to an embodiment of the present disclosure.

As shown in FIG. 3, an embodiment of the present disclosure provides an application switching method, applied to an electronic device with a touchscreen, and the method provided in this embodiment of the present disclosure includes the following steps.

S101. Detect a touch pressure value that is generated by a touch operation when a target region of the touchscreen is touched.

S102. When detecting that the touch pressure value is greater than a preset threshold, generate a first display window in a current display interface of the electronic device, and present a first application in the first display window according to a preset rule.

S103. Switch the current display interface to a display interface of the first application if detecting an enable signal for the first application, where the current display interface is different from the display interface of the first application.

In the application switching method provided in this embodiment of the present disclosure, the touch pressure value generated by the touch operation in the target region is detected, and when the touch pressure value is greater than the preset threshold, the first display window is generated in the current display interface of the electronic device, to present the first application in the first display window, for a user to "preview" the first application. Because the application switching method provided in this embodiment of the present disclosure is based on the touch pressure value that is generated by the touch operation when the target region on the touchscreen is touched, according to the method provided in this embodiment of the present disclosure, the first application can be previewed in a display window (e.g., the first display window) in the current display interface without a home button or a multifunctional menu button of the electronic device. The method has a relatively low requirement on hardware of the electronic device.

In this embodiment of the present disclosure, the electronic device supports a force touch technology. The electronic device may sense, by using the force touch technology, a touch pressure value of pressure that is applied to a touch location by a touch operation when a user presses the touchscreen of the electronic device, for example, magnitude of pressure of a light press and a heavy press. When the touch pressure value meets the preset threshold, the electronic device responds to, based on the touch pressure value, the touch operation when the user presses the touchscreen of the electronic device, to perform a function corresponding to the touch operation.

To avoid a conflict between a triggering function in a region supporting a particular force touch technology of the electronic device and triggering functions produced by a light press and a heavy press, the target region in this embodiment of the present disclosure is a region that is on the touchscreen of the electronic device and that does not support the particular force touch technology. A region supporting the particular force touch technology means that if detecting press operations meeting the preset threshold in the region, the electronic device makes different related operation responses in different interfaces. For example, if the electronic device supports the particular force touch technology in a region A in a home screen, all other regions in the home screen other than the region A may be used as the target region in this embodiment of the present disclosure.

The electronic device may determine, based on the touch location, whether the touch location of the touch operation of the user is located in the target region or the region supporting the particular force touch technology. Therefore, the preset threshold in this embodiment of the present disclosure may be consistent or inconsistent with a triggering pressure threshold that is specified for the region supporting the particular force touch technology. Moreover, even if the triggering pressure threshold is consistent with the preset threshold, a response may be further made to the touch operation with reference to the touch location. For example, if detecting that the touch location of the touch operation of the user is in the region supporting the particular force touch technology, and the touch pressure value of the touch operation is greater than or equal to the triggering pressure threshold, the electronic device can make only a corresponding operation response based on the triggering function corresponding to the region supporting the particular force touch technology. If detecting that the touch location of the touch operation of the user is in the target region, and the touch pressure value of the touch operation is greater than the preset threshold, the electronic device displays the first application in the first display window.

Optionally, to avoid a misoperation, the preset threshold in this embodiment of the present disclosure is inconsistent with the triggering pressure threshold for the region supporting the particular force touch technology. For example, if the preset threshold is F1, the triggering pressure threshold is F2, and F2 may be greater than F1 or F2 may be less than F1. The triggering pressure threshold and the preset threshold may be set by a vendor before delivery of the electronic device, or may be customized by the user as needed. This is not limited in this embodiment of the present disclosure.

In this embodiment of the present disclosure, the electronic device may control the first display window to disappear from the current display interface when the touch operation is released from the touchscreen or after the touch operation is released from the touchscreen a preset time.

In this embodiment of the present disclosure, the preset time is not limited, and may be set by a vendor before delivery of the electronic device, or may be customized by the user. For example, the preset time may be 10 s (seconds) to 30 s.

In this embodiment of the present disclosure, the first application may be an icon of an application program, or may be a display interface of an application program.

In this embodiment of the present disclosure, a shape of the first display window may be any one of a rectangular, circular, elliptical, or irregular shape, and is not limited in this embodiment of the present disclosure.

An area of the first display window may be determined based on the touch pressure value. For example, if the touch pressure value gradually increases, the area of the first display window is gradually increased at a first speed. The first speed gradually increases with the touch pressure value. When the area of the first display window is increased to a preset area, the area of the first display window is gradually increased at a second speed. In this case, the second speed gradually decreases with the touch pressure value, until the first display window totally covers the current display interface and the second speed becomes 0. Alternatively, when the touch operation is performed on the touchscreen, the electronic device gradually increases the area of the first display window at a preset speed, and when the area of the first display window is increased to a preset area, the electronic device gradually enlarges the first display window at a third speed to totally cover the current display interface. The third speed is less than the preset speed, and when the first display window totally covers the current display interface, the third speed decreases to 0.

The application in this embodiment of the present disclosure may be a native system application program (e.g., a system tool, a calendar, or an address book), or may be a third-party application program. This is not limited in this embodiment of the present disclosure.

Further, the application in this embodiment of the present disclosure may be at least one application that is running in the electronic device or that is running in a preset period in the electronic device. The at least one application includes an icon or a display interface of a background task or a foreground task. The preset period may be set by a vendor before delivery of the electronic device, or may be customized by the user as needed. This is not limited in this embodiment of the present disclosure.

A preset policy in this embodiment of the present disclosure is as follows. Based on a preset priority of each of the at least one application that is running in the electronic device, the electronic device selects, from the at least one application, an application meeting a requirement as the first application. The preset priority may be determined from a basic attribute of each of the at least one application, or may be determined from an association between applications.

Optionally, with reference to FIG. 3, step S102 in this embodiment of the present disclosure may be implemented in the following manner:

S1021*a*. The electronic device obtains a preset priority of each of at least one application that is running in the electronic device.

S1022*a*. The electronic device determines an application with a highest preset priority in the at least one application as the first application based on the preset priority of each application.

It may be understood that, each of the at least one application has a preset priority before delivery of the electronic device, or the preset priority of each application may be customized by the user.

In one aspect, the preset priority of each application may be determined based on the basic attribute of the application. Optionally, step S1021*a* may be implemented in the following manner.

S1021*a*1. Determine the preset priority of each application based on a basic attribute of each application, where the basic attribute of the application includes at least one of a use time of the application, a time point at which the application is installed, frequency of using the application, a time point at which the application is updated, a rank based on an initial of a name of the application, a memory space size occupied by the application when the application runs in the electronic device, a size of the application, a rank of an operating position at which the application is located on the electronic device, a color similarity of an icon corresponding to the application, or a color similarity of a display interface corresponding to the application.

Specifically, the use time is a running time, recorded by the electronic device, of each application, and the electronic device may store the running time of each application in a memory of the electronic device. First, the electronic device obtains a use time of each application. For example, a processor of the electronic device may obtain the use time of each application from the memory. Then, the electronic device chronologically sorts the at least one application based on the use time of each application. Finally, the electronic device sets a preset priority for each application in descending order or ascending order of preset priorities. For example, if a use time of a QQ® application is 2015/10/1 8:01, and a use time of a WeChat® application is 2015/10/1 12:05, the electronic device sets a preset priority of the WeChat® application to be higher than a preset priority of the QQ® application. Alternatively, a preset priority of a last used application is set to the lowest priority, and then a preset priority of each application is set in ascending order of preset priorities based on the use time of each application.

The use frequency is a quantity, recorded by the electronic device, of times that each application is used in a preset time, and the electronic device stores frequency of using each application in the memory of the electronic device. First, the electronic device obtains the use frequency of each application. For example, the processor of the electronic device obtains the use frequency of each application from the memory. Then, the electronic device may sort each application in descending order or ascending order of use frequencies. Finally, the electronic device sets a preset priority for each application in descending order or ascending order of preset priorities based on a rank of each application.

The installation time is a time, recorded by the electronic device, when each application is installed on the electronic device, and may be a time when a vendor installs the application before delivery, or may be a time when the user installs the application.

For example, first, the electronic device obtains an installation time of each application. Then, the electronic device chronologically or reversely chronologically sorts each application based on the installation time of each application. Finally, the electronic device sets a preset priority for each application in descending order or ascending order of preset priorities based on a rank of each application.

The update time is a time, recorded by the electronic device, when each application is updated last time.

It may be understood that, the at least one application in this embodiment of the present disclosure is arranged on the electronic device in M rows×N columns, the electronic device has M×N operating positions, each application is located at one operating position, and the electronic device allocates a rank to each operating position. Therefore, the electronic device may alternatively determine the preset priority of each application based on the rank of each of the M×N operating positions. M and N both are positive integers greater than or equal to 1.

The update time of each application, a memory space size occupied by each application when the application runs in the electronic device, a size of each application, and a rank of an operating position at which each application is located on the electronic device may be all obtained from the memory of the electronic device by using the processor. For a method for the electronic device to set a preset priority for each application, refer to the foregoing methods based on the installation time, the use time, and the use frequency. Details are not further described herein in this embodiment of the present disclosure.

To reduce efficiency of the processor of the electronic device, in this embodiment of the present disclosure, some applications frequently used by the user may be further selected from the at least one application (e.g., an application whose use frequency is greater than or equal to a preset frequency threshold may be determined as an application frequently used by the user), and then the first application is selected from the applications frequently used by the user. For example, if 25 applications are running in the electronic device, and only five of the 25 applications are applications frequently used by the user, the electronic device may select an application from the five applications as the first application, and display the application in the first display window. In this way, the electronic device neither needs to sort each of the at least one application, nor needs to obtain the preset priority of each application, but needs to obtain only preset priorities of the applications frequently used by the user. Therefore, processing efficiency of the electronic device is improved.

It should be noted that, a preset priority sorting instruction may be stored in the memory of the electronic device, and the processor of the electronic device reads executable program code stored in the memory to run a program corresponding to the executable program code. For example, the sorting instruction is a sorting instruction of sorting applications in descending order of use frequencies, or a sorting instruction of sorting applications in chronological order of use times.

It should be noted that, when the preset priority of each application is determined based on any one of the basic attributes, basic attributes of two or more applications may be the same. Because each application needs to have a different preset priority, when basic attributes of two or more applications are the same, preset priorities of the two or more applications whose basic attributes are the same may be further determined with reference to another attribute of the basic attributes.

Specifically, step S1021a may be further implemented in the following manner.

S1021a2. If first child attribute values corresponding to two or more applications are equal, obtain a second child attribute value of each of the applications whose first child attribute values are equal, where a first child attribute is any one of the basic attributes, and a second child attribute is any attribute in the basic attributes except the first child attribute.

S1021a3. Determine, based on the second child attribute value of each of the applications whose first child attribute values are equal, a preset priority of each of the applications whose first child attribute values are equal.

For example, if memory spaces occupied by the QQ® application and the WeChat application are the same, preset priorities of the QQ® application and the WeChat application may be further determined based on any one of installation times, use times, or initial-based ranks of the QQ® application and the WeChat® application.

An icon or a display interface of each application corresponds to one color similarity. In descending order of color similarities, an application with a highest color similarity may be determined as the application with the highest preset priority, and an application with a lowest color similarity may be determined as an application with a lowest preset priority. Then, the preset priority of each application is sequentially set.

For example, an application that is in the at least one application and whose color similarity is the closest to a color similarity of the current display interface of the electronic device is determined as the application with the highest preset priority, and an application that is in the at least one application and whose color similarity differs greatest from the color similarity of the current display interface of the electronic device is determined as the application with the lowest preset priority. Then, preset priorities of other applications are sequentially set based on degrees of closeness to the color similarity of the current display interface.

It should be noted that, in this embodiment of the present disclosure, when the preset priority of each application is determined based on the color similarity, an application may alternatively be selected as the first application based on the preset priority of each application from applications frequently used by the user.

It may be understood that, in this embodiment of the present disclosure, the electronic device may update the preset priority of each application in real time, or may periodically update the preset priority of each application based on a preset update period, or may update the preset priority of each application when the touch pressure value is greater than the preset threshold.

In this embodiment of the present disclosure, the electronic device may control an application to be displayed in the first display window in a form of an icon, or may control an application to be displayed in the first display window in a form of a display interface displayed when the application runs. It may be understood that, the display interface displayed when the application runs is a display interface, running on the electronic device, of the application when the electronic device performs the application as operated by the user.

Optionally, the current display interface when the electronic device runs may be a home screen, or may be a display interface of a third application. Therefore, if the current display interface is the display interface of the third application, step S102 may alternatively be implemented in the following manner.

S1021b. The electronic device obtains a category to which each of at least one application that is running in the electronic device belongs.

S1022b. The electronic device determines a target category from the category to which each application belongs, where the target category is the same as a category of the third application, and the target category includes one or more applications.

S1023b. The electronic device determines an application with a highest preset priority in the one or more applications as the first application.

Specifically, the electronic device may categorize the at least one application before delivery, or may categorize the at least one application as customized by the user. For example, the at least one application may be categorized into a social application (e.g., the QQ® application, the WeChat® application, or a microblogging application), a financial application (various bank APPs), an entertainment application (e.g., a news APP or a game APP), and the like. A specific category is not limited in this embodiment of the present disclosure.

For example, if the category to which the third application displayed in the current display interface belongs is the social application, when the touch pressure value is greater than the preset threshold, an application with a highest preset priority is selected from at least one application included in the social application and is displayed in the first display window.

For example, the social application includes (an application 1, an application 2, an application 3, and an application 4), and each of the application 1, the application 2, the application 3, and the application 4 corresponds to one preset priority. It is assumed that preset priorities of the application 1, the application 2, the application 3, and the application 4 are in descending order (the preset priorities may be determined based on steps S1021a and S1022a). If a preset priority of the application 1 is the highest, the application 1 may be displayed in the first display window.

It should be noted that, in an actual use process, the third application displayed in the current display interface may be the application with the highest preset priority in the application category to which the third application belongs. Therefore, in this embodiment of the present disclosure, in this case, step S1023b1 may be further performed as follows.

S1023b1. If a priority of the third application is the highest in the application category to which the third application belongs, the first application selected by the electronic device may be an application that is in the application category to which the third application belongs and whose priority is adjacent to and lower than the priority of the third application.

For example, if the third application is the application 1 in the social application, the first application determined by performing step S1023b1 is the application 2.

With reference to FIG. 3, in this embodiment of the present disclosure, the electronic device may display only the first application in the first display window, or may simultaneously display a plurality of applications in the first display window. Therefore, the method provided in this embodiment of the present disclosure further includes the following step.

S102-1. When the first application is presented in the first display window according to the preset rule, the electronic device presents, in the first display window, another application that is other than the first application and that is in the at least one application that is running in the electronic device. In other words, all applications that are running in the electronic device are simultaneously displayed in the first display window, for the user to select a needed application from the applications for switching.

Figure 4A:
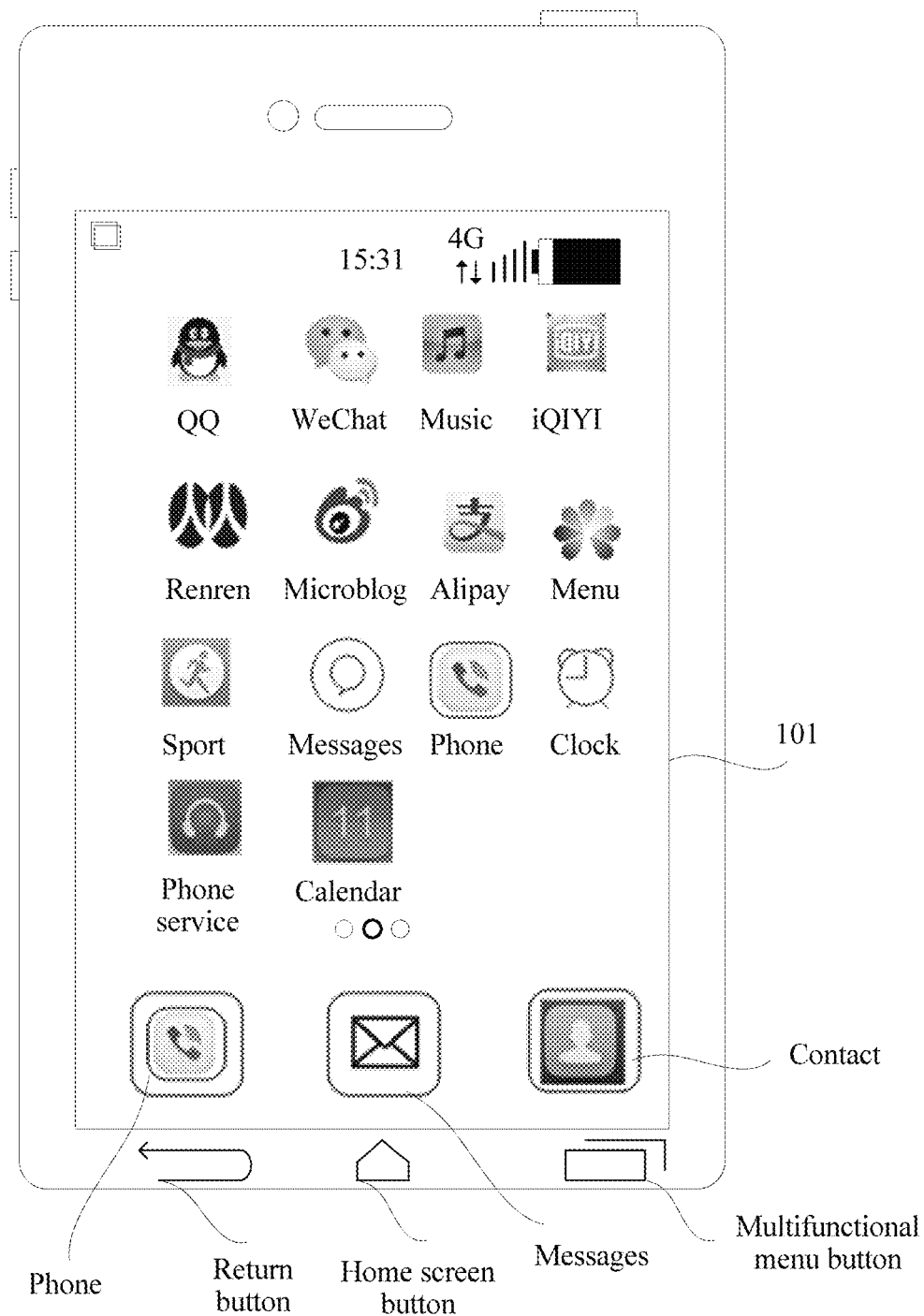
FIG. 4a is a diagram of a first scenario of an application switching method according to an embodiment of the present disclosure.

As shown in FIG. 4a, FIG. 4a shows a first scenario to which the application switching method provided in this embodiment of the present disclosure is applied. That is, the current display interface of the electronic device is the home screen of the electronic device.

Specifically, in an actual use process, if the current display interface of the electronic device is a home screen shown in FIG. 4a, when the touch pressure value meets the preset threshold, the application displayed in the first display window is the application with the highest preset priority in the at least one application that is running in the electronic device.

Figure 4B:
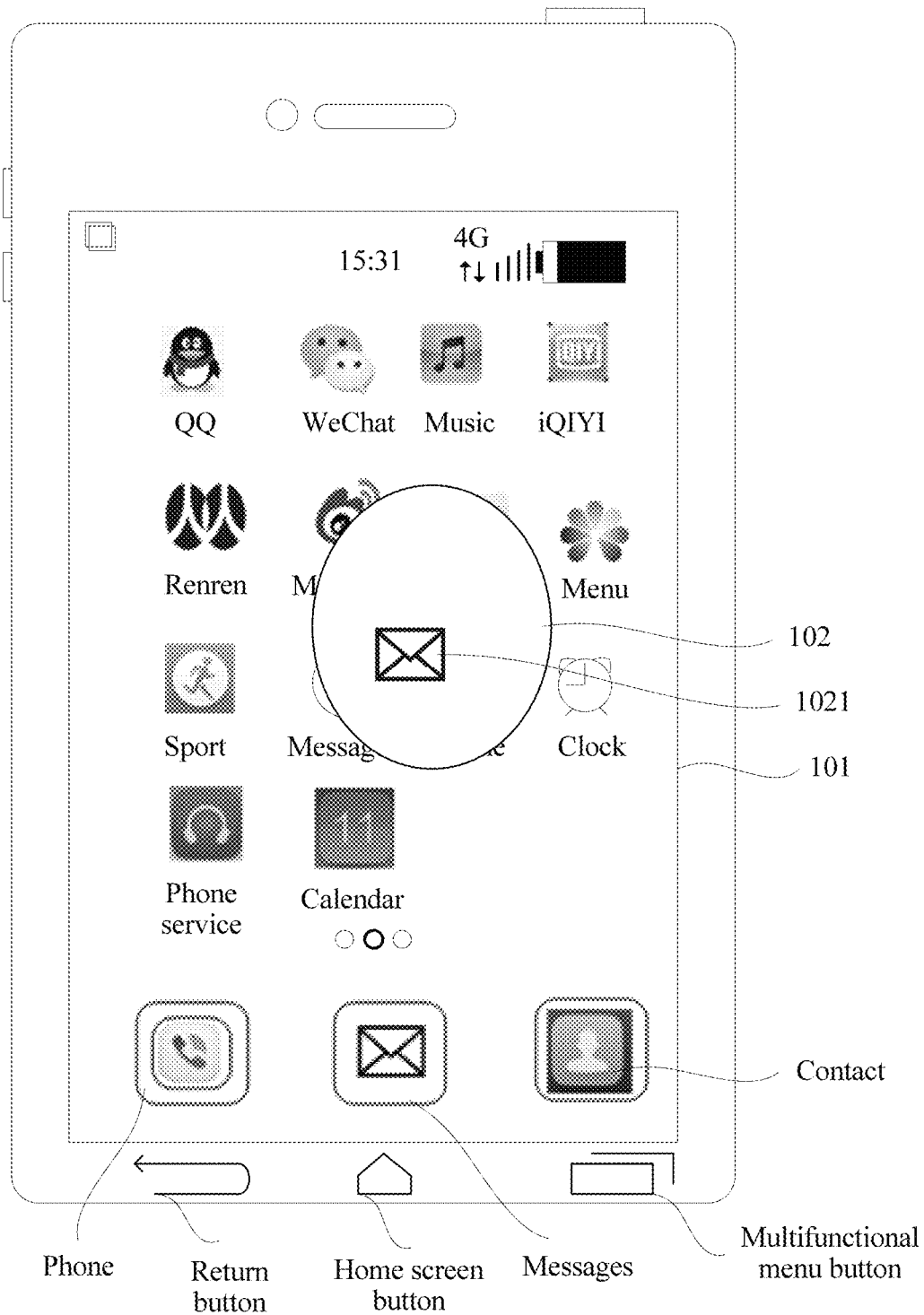
FIG. 4b is a schematic display diagram of an application in the first scenario according to an embodiment of the present disclosure.

Specifically, as shown in FIG. 4b, when the touch pressure value meets the preset threshold, an application 1021 (using an SMS message icon as an example) is displayed in a current display interface 101 of the electronic device by using a first display window 102, for the user to "preview". In the scenario shown in FIG. 4a, if the application 1021 is an application running in background of the electronic device, a display interface, running on the electronic device, of the first application is displayed in the first display window. In this way, the display interface, running on the electronic device, of the first application can be "previewed" by using the first display window.

Figure 4C:
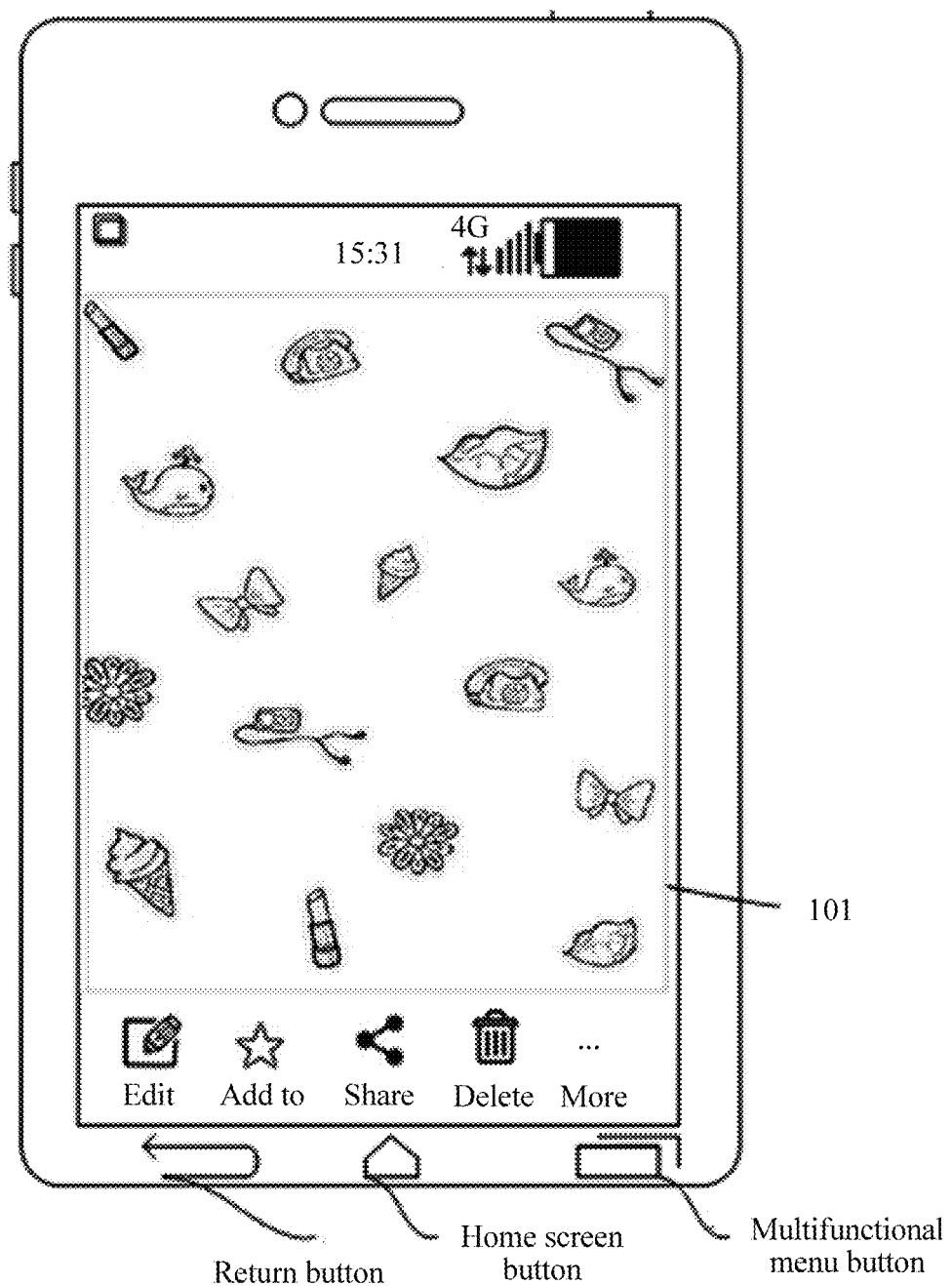
FIG. 4c is a diagram of a second scenario of an application switching method according to an embodiment of the present disclosure.

As shown in FIG. 4c, FIG. 4c shows a second scenario to which the application switching method provided in this embodiment of the present disclosure is applied. That is, the current display interface of the electronic device is a display interface of any application program or process that is running in the electronic device. In description of FIG. 4c, for example, the current display interface of the electronic device is a picture in an album of the electronic device, and this embodiment of the present disclosure is not limited thereto.

Figure 4D:
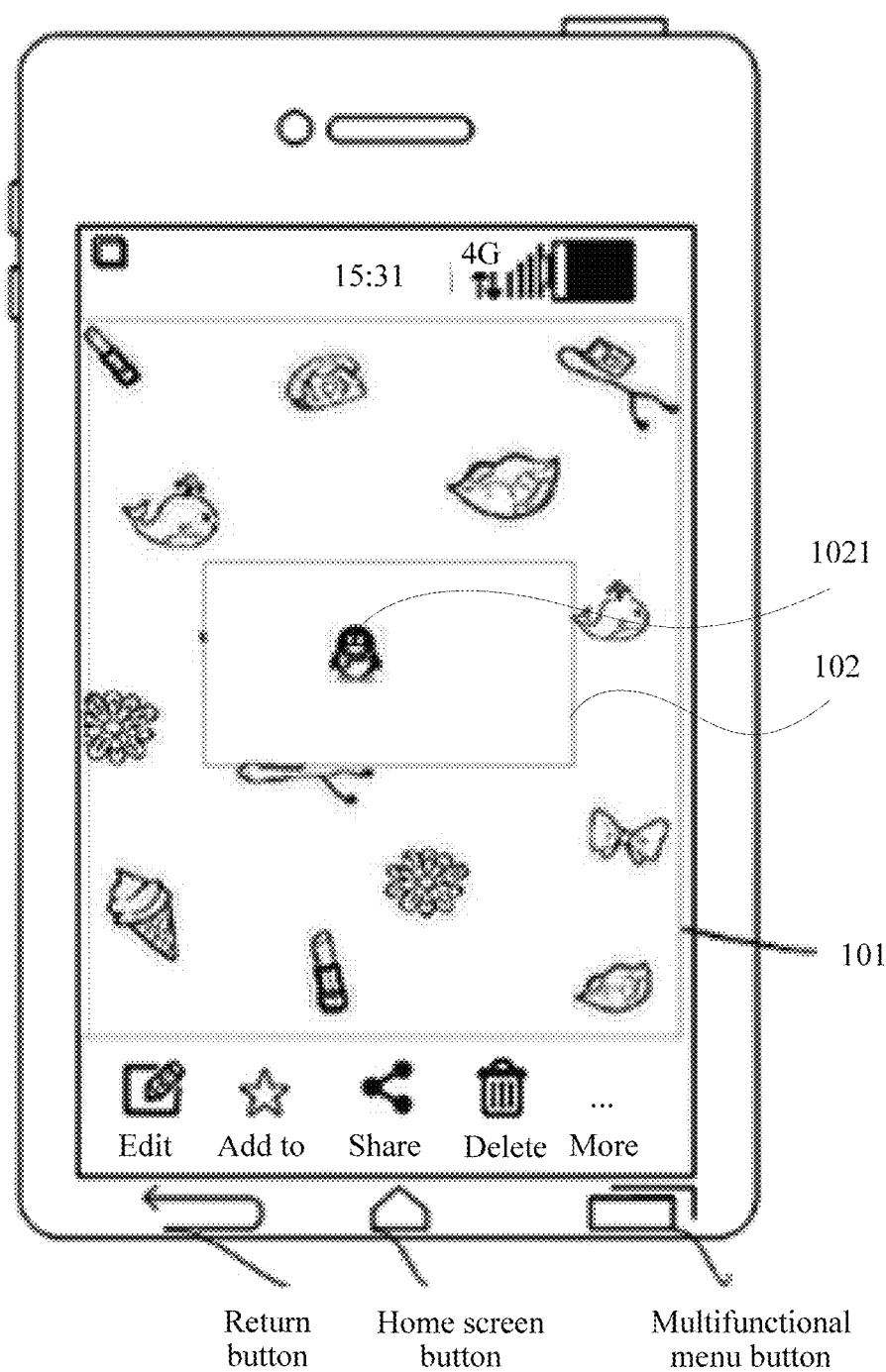
FIG. 4d is a schematic display diagram 1 of an application in the second scenario according to an embodiment of the present disclosure.
Figure 4E:
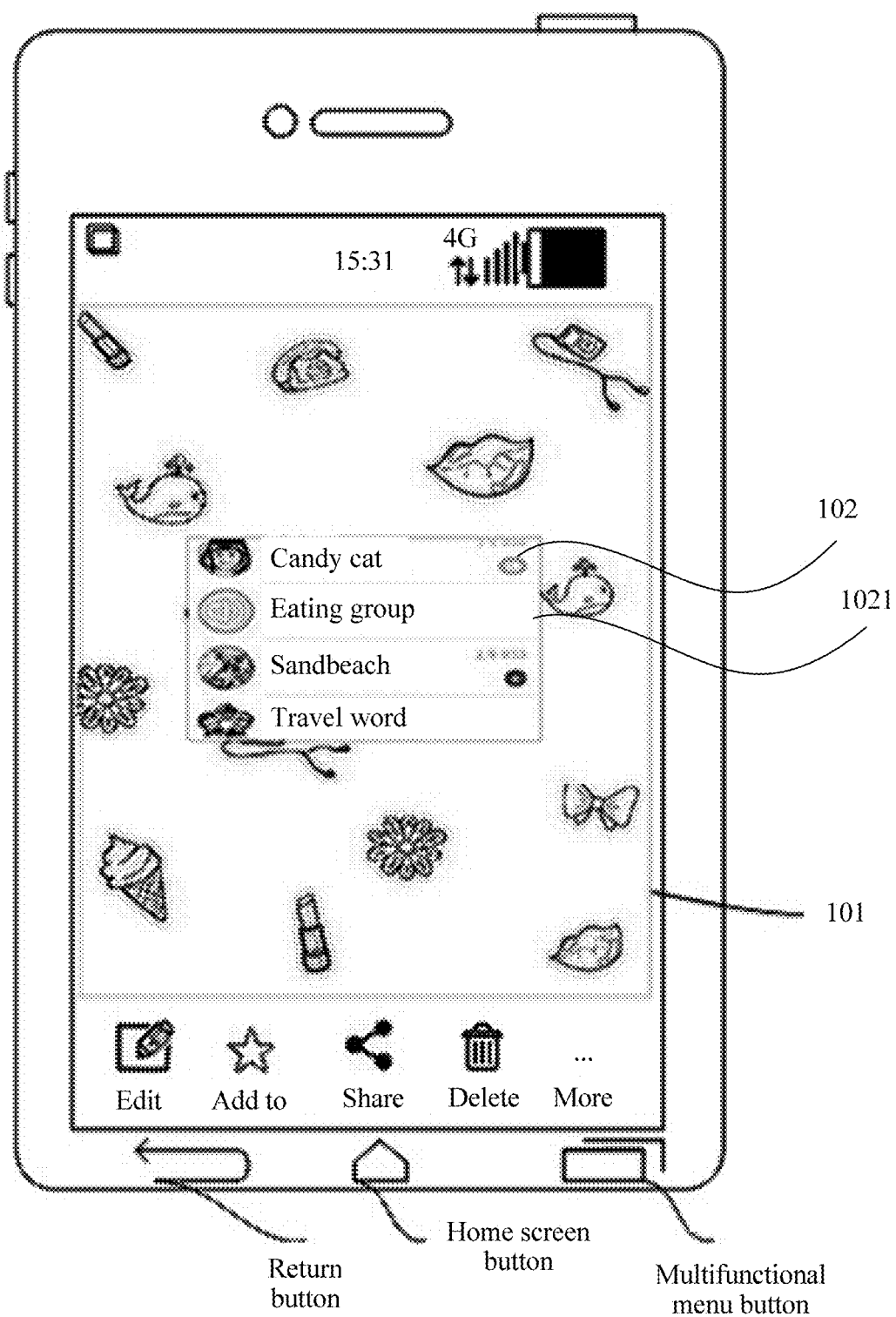
FIG. 4e is a schematic display diagram 2 of an application in the second scenario according to an embodiment of the present disclosure.

Specifically, in an actual use process, if the current display interface of the electronic device is not the home screen, but an interface of an application program or a process that is running, as shown in FIG. 4c, when the electronic device selects the first application, a preset priority of the first application needs to be higher than a preset priority of the application program or the process that is running in the current display interface of the electronic device. For example, as shown in FIG. 4d, a preset priority of the QQ® application is higher than a preset priority of an album application program. If a picture in an album is displayed in the current display interface, when the touch operation meets the triggering pressure threshold, an icon of the QQ® application is displayed in the first display window, or as shown in FIG. 4e, a display interface of the QQ® application is displayed in the first display window.

In an actual operation process, the first application displayed in the first display window may be not an application needed by the user. Therefore, after step S103, the first application may be further replaced based on a signal that is generated when the user triggers the touchscreen, to display a second application.

Figure 5A:
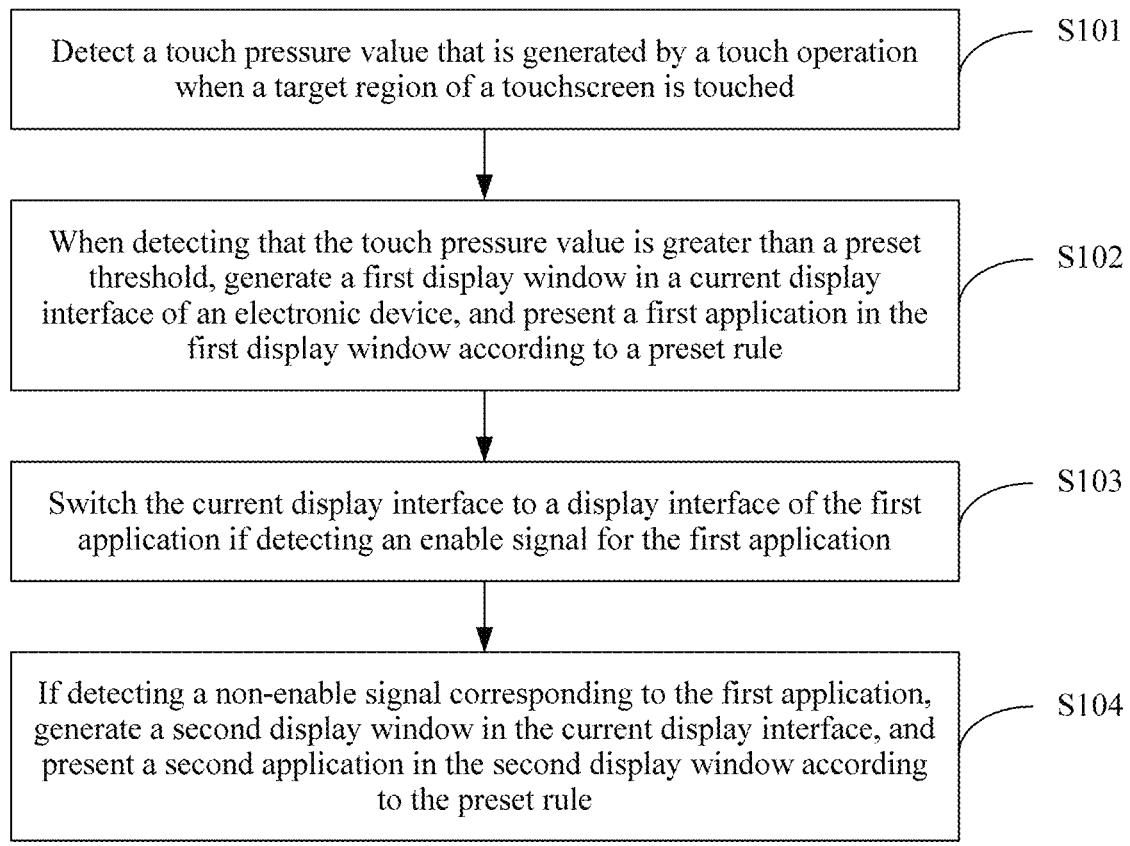
FIG. 5a is a schematic flowchart 2 of an application switching method according to an embodiment of the present disclosure.

Optionally, with reference to FIG. 3, as shown in FIG. 5a, the method provided in this embodiment of the present disclosure further includes the following step:

S104. If detecting a non-enable signal corresponding to the first application, the electronic device generates a second display window in the current display interface, and presents a second application in the second display window according to the preset rule, where a preset priority of the second application is lower than a preset priority of the first application.

Specifically, a touch operation generating the non-enable signal and the touch operation generating the touch pressure value may be a same touch operation, or may be different touch operations.

It may be understood that, when the touch operation is released from the touchscreen, the electronic device controls the first display window to disappear from the current display interface. Therefore, after generating the touch pressure value, the touch operation is not released from the touchscreen of the electronic device, but only remains in touch with the touchscreen. In this way, when the user determines that the first application is not a needed application, the electronic device may be further triggered by using the touch operation to generate the non-enable signal. Specifically, the non-enable signal is a signal generated when the touch pressure value is greater than the preset threshold.

When the touch operation is released from the touchscreen, the electronic device controls the first display window to disappear from the current display interface after the touch operation is released from the touchscreen the preset time. Therefore, after the touch operation generates the touch pressure value greater than the preset threshold, the touch operation is released from the touchscreen, and then the non-enable signal corresponding to the first application is generated in the preset time.

Figure 5B:
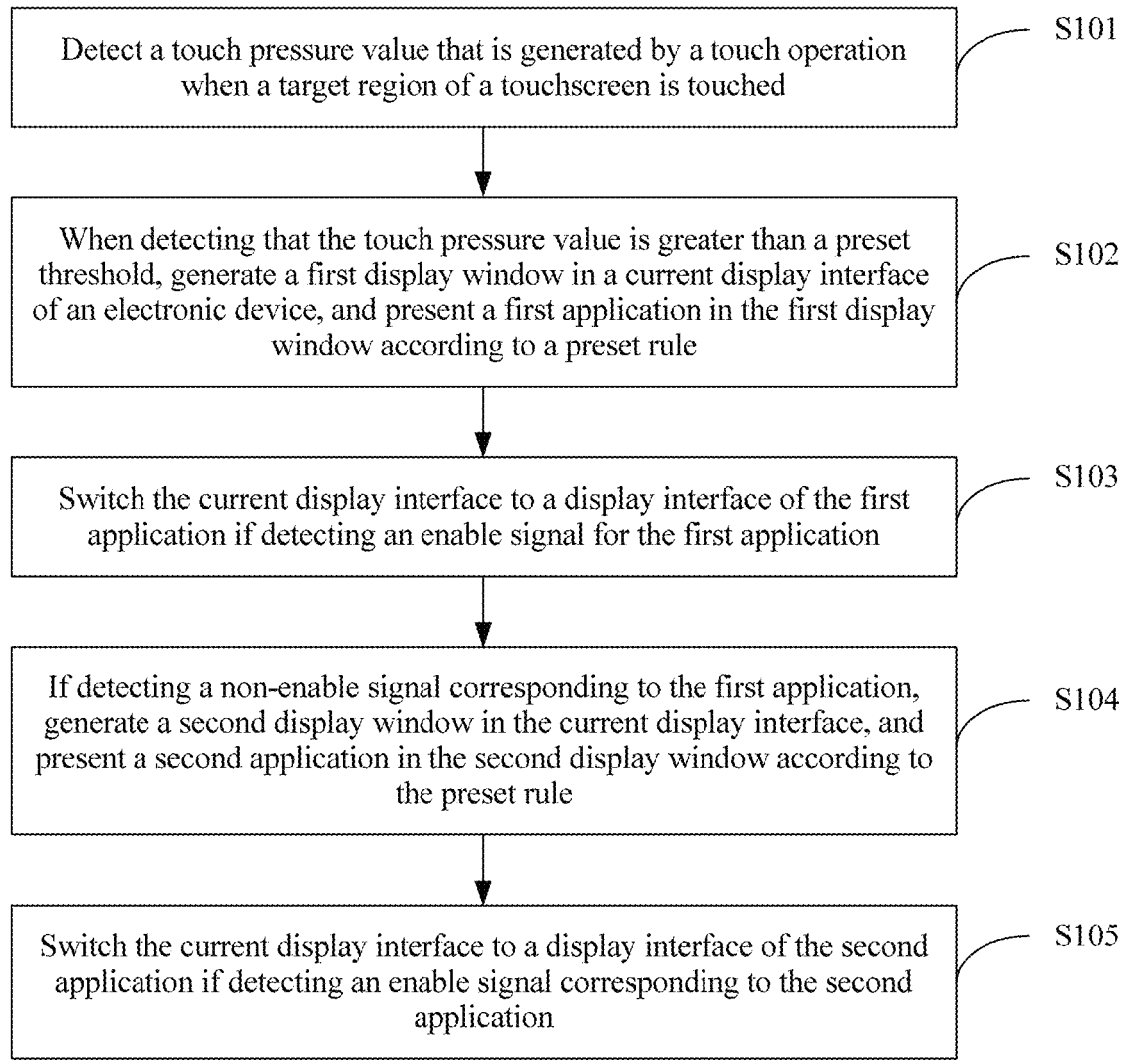
FIG. 5b is a schematic flowchart 3 of an application switching method according to an embodiment of the present disclosure.

Optionally, with reference to FIG. 5a, as shown in FIG. 5b, the method provided in this embodiment of the present disclosure further includes the following step:

S105. The electronic device switches the current display interface to a display interface of the second application if detecting an enable signal corresponding to the second application.

In this embodiment of the present disclosure, the second display window may be located in the first display window, or may cover the first display window, or may be located in another region in the current display interface other than the first display window.

It may be understood that, in this embodiment of the present disclosure, switching the current display interface to the display interface of the second application, or switching the current display interface to the display interface of the first application may be performed a plurality of times as needed.

It may be understood that, if the non-enable signal corresponding to the first application is detected, an application displayed in the second display window is the second application.

In one aspect, when the second display window is located in the first display window, an area of the second display window may be gradually increased until the first display window is covered by the second display window. In this process, the second application displayed in the second display window gradually covers the first application.

In another aspect, when the first display window and the second display window are located in different regions of the current display interface, two applications (the first application and the second application) may be simultaneously displayed in the current display interface for "preview".

Moreover, the user may compare the two applications, to select a needed application from the two applications for switching.

In still another aspect, when the first display window covers the second display window, it may be understood as that a window the same as the first display window is generated as the second display window to display the second application. In this case, the first display window and the first application are replaced with the second display window and the second application.

Figure 5C:
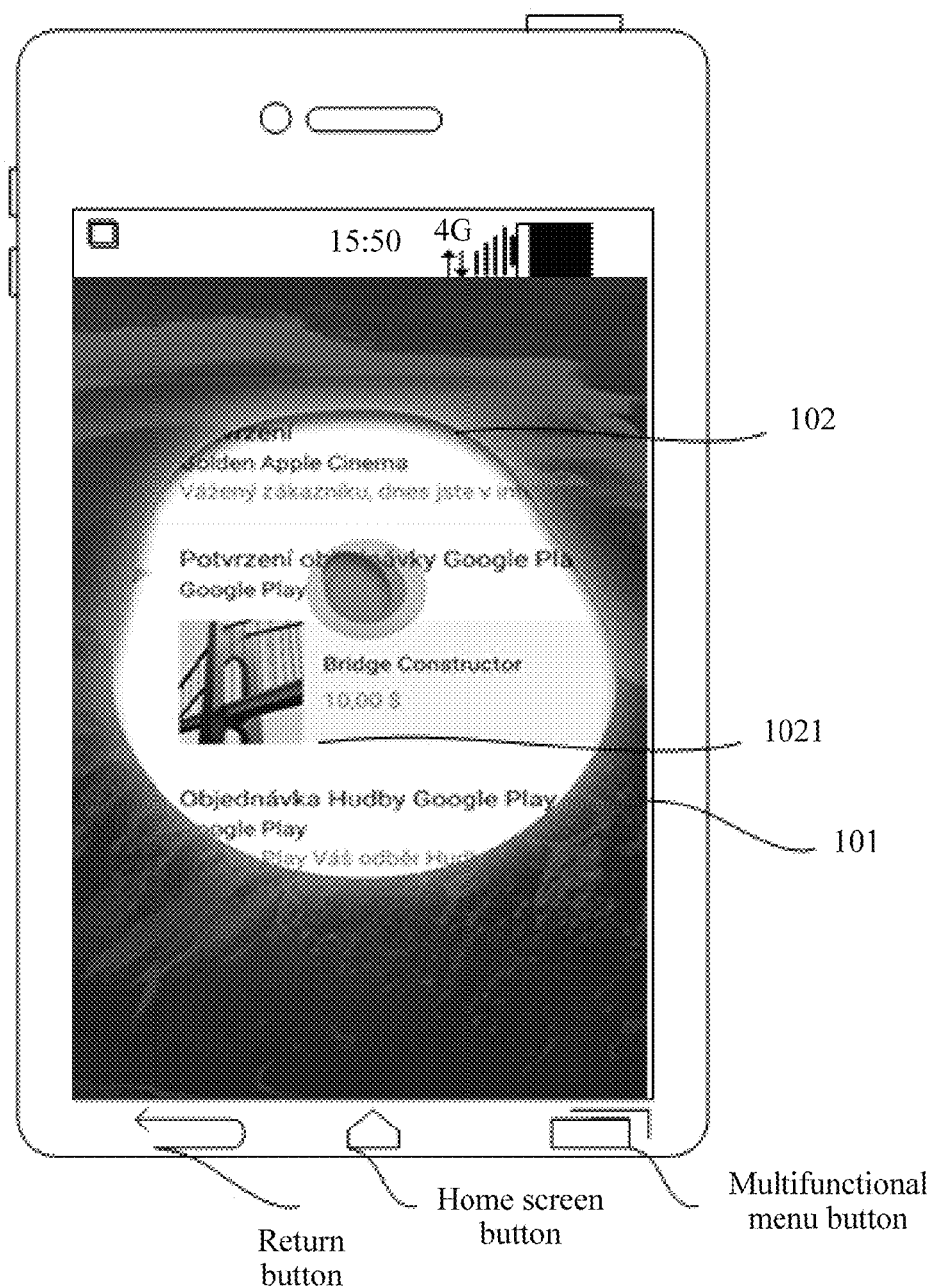
FIG. 5c is a schematic diagram 1 of generating a second display window according to an embodiment of the present disclosure.

As shown in FIG. 5c, when the electronic device detects that the touch operation of the user in the target region meets the preset threshold, a first application 1021 is displayed in a first display window in a current display interface 101 of the electronic device. In description of FIG. 5c, for example, the first application is a display interface for document reading.

It may be understood that, for at least one application running in the electronic device, each application corresponds to one display interface, and the display interface of each application is stacked in a display interface of the electronic device in descending order of preset priorities. When the touch pressure value meets the preset threshold, content in a region that is in a display interface of the first application 1021 and that corresponds to the first display window is displayed in the first display window 101.

Figure 5D:
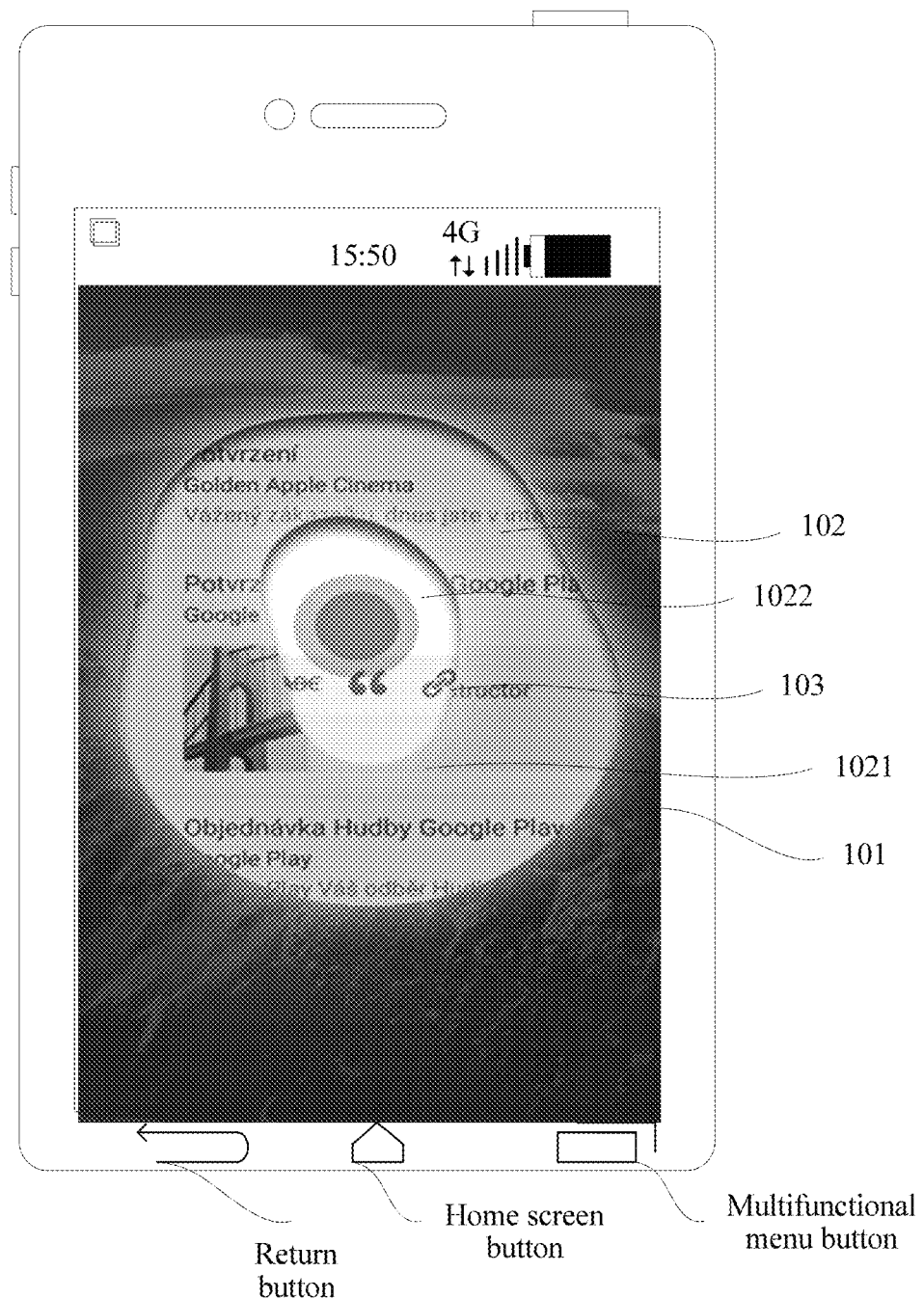
FIG. 5d is a schematic diagram 2 of generating a second display window according to an embodiment of the present disclosure.
Figure 5E:
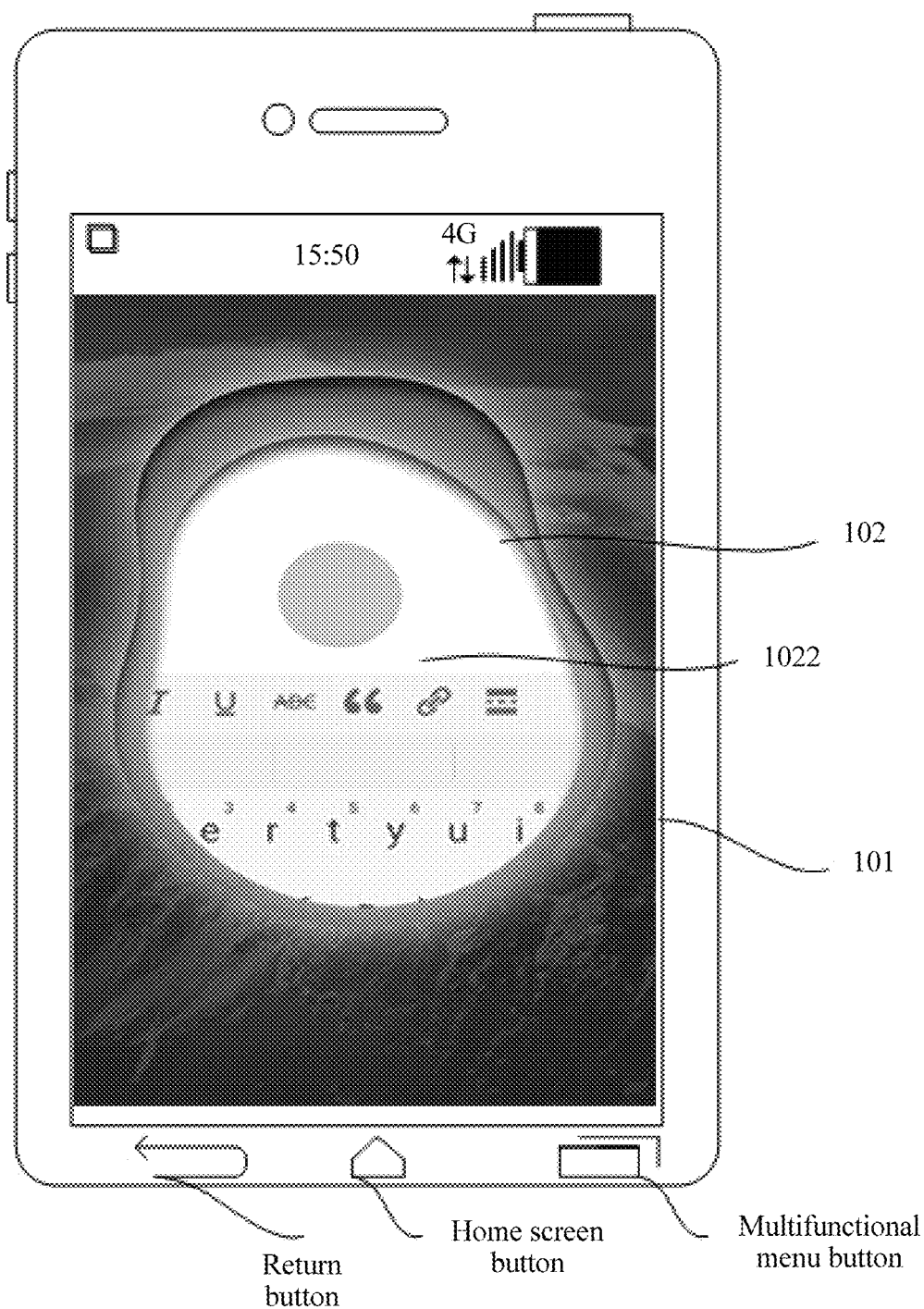
FIG. 5e is a schematic diagram 3 of generating a second display window according to an embodiment of the present disclosure.

As shown in FIG. 5d by way of an example in which the second display window is located in the first display window, when the electronic device detects that the user further triggers the touchscreen in the target region and the non-enable signal is generated, a second display window 103 is generated in the current display interface based on the non-enable signal. An area covered by the second display window 103 in the current display interface is less than an area covered by the first display window in the current display interface. Therefore, a part of the interface of the first application 1021 is covered by the second display window to display a second application, and the second application 1022 located in the second display window 103 and a display interface, which is located in a region between a first display region and a second display region and not covered by the second display window, of the first application 1021 are simultaneously displayed in the first display region. Because the area of the second display window gradually increases with a parameter (e.g., the touch pressure value) of the non-enable signal, finally, the second display window totally covers the first display window, and the first application 1021 is totally covered by the second application 1022. Content in a region that is in a display interface of the second application 1022 and that corresponds to the second display window is displayed in the second display window, as shown in FIG. 5e.

Figure 5F:
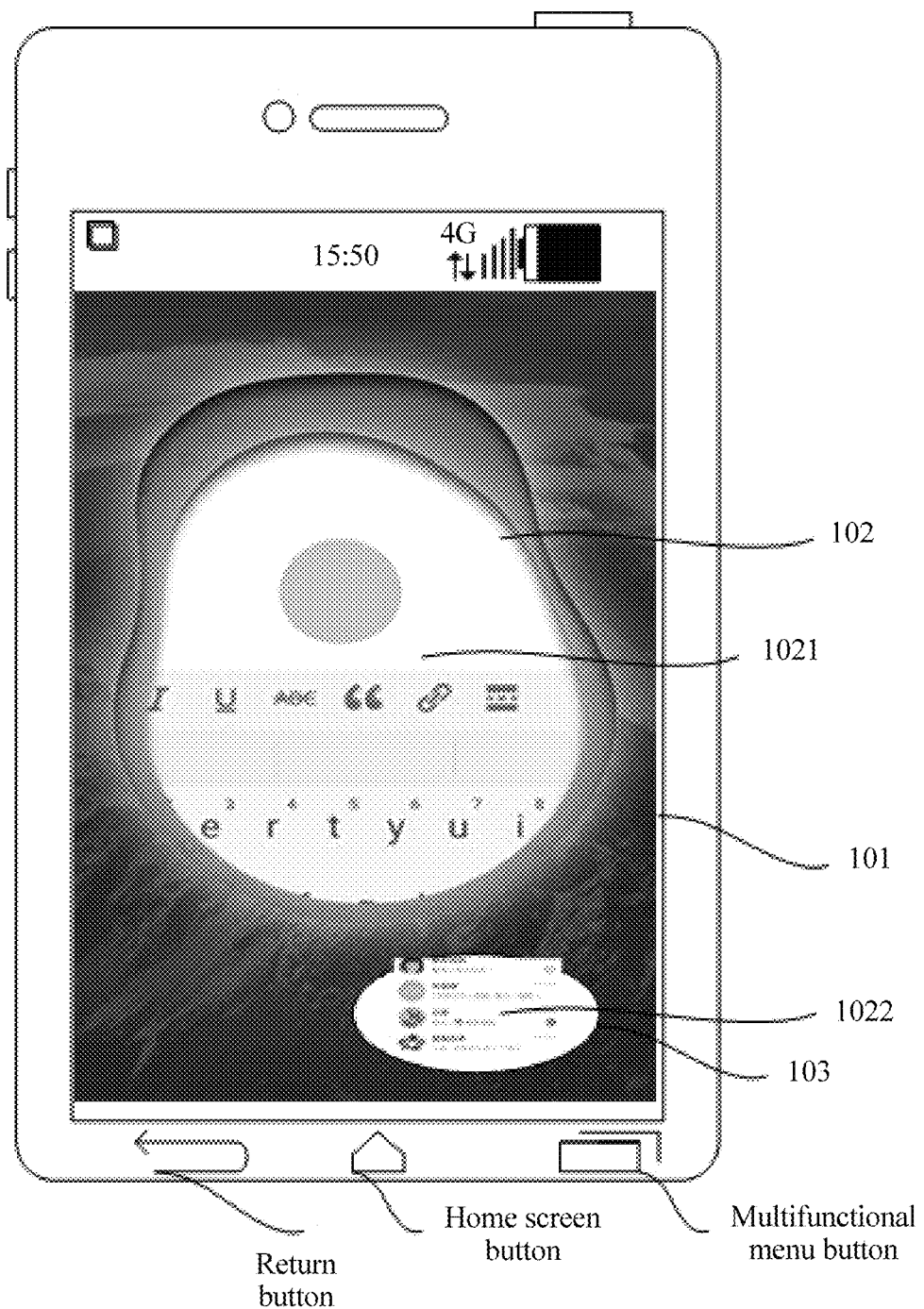
FIG. 5f is a schematic diagram 4 of generating a second display window according to an embodiment of the present disclosure.

With reference to FIG. 5c, as shown in FIG. 5f by way of using an example in which a second display window 103 and a first display window 102 are located in different regions of a current display interface 101, when the electronic device detects that the user further triggers the touchscreen in the target region and the non-enable signal is generated, the second display window 103 is generated in the current display interface 101 based on the non-enable signal, and a display interface of a second application 1022 is displayed in the second display window 103.

Optionally, with reference to FIG. 3, step S103 in this embodiment of the present disclosure may be implemented in the following manner.

S1031. If detecting that a touch location of the touch operation moves to a target location, and the touch operation is released from the touchscreen, the electronic device controls the first display window to be enlarged until the first display window totally covers the current display interface, and covers the current display interface by using the display interface corresponding to the first application displayed in the first display window.

S103 provided in this embodiment of the present disclosure is also applicable to switching the current display interface to the display interface of the second application.

The target location in this embodiment of the present disclosure may be an edge of the touchscreen of the electronic device, or may be a location specified by a vendor before delivery of the electronic device, or may be a location customized by the user. This is not limited in this embodiment of the present disclosure.

Figure 6A:
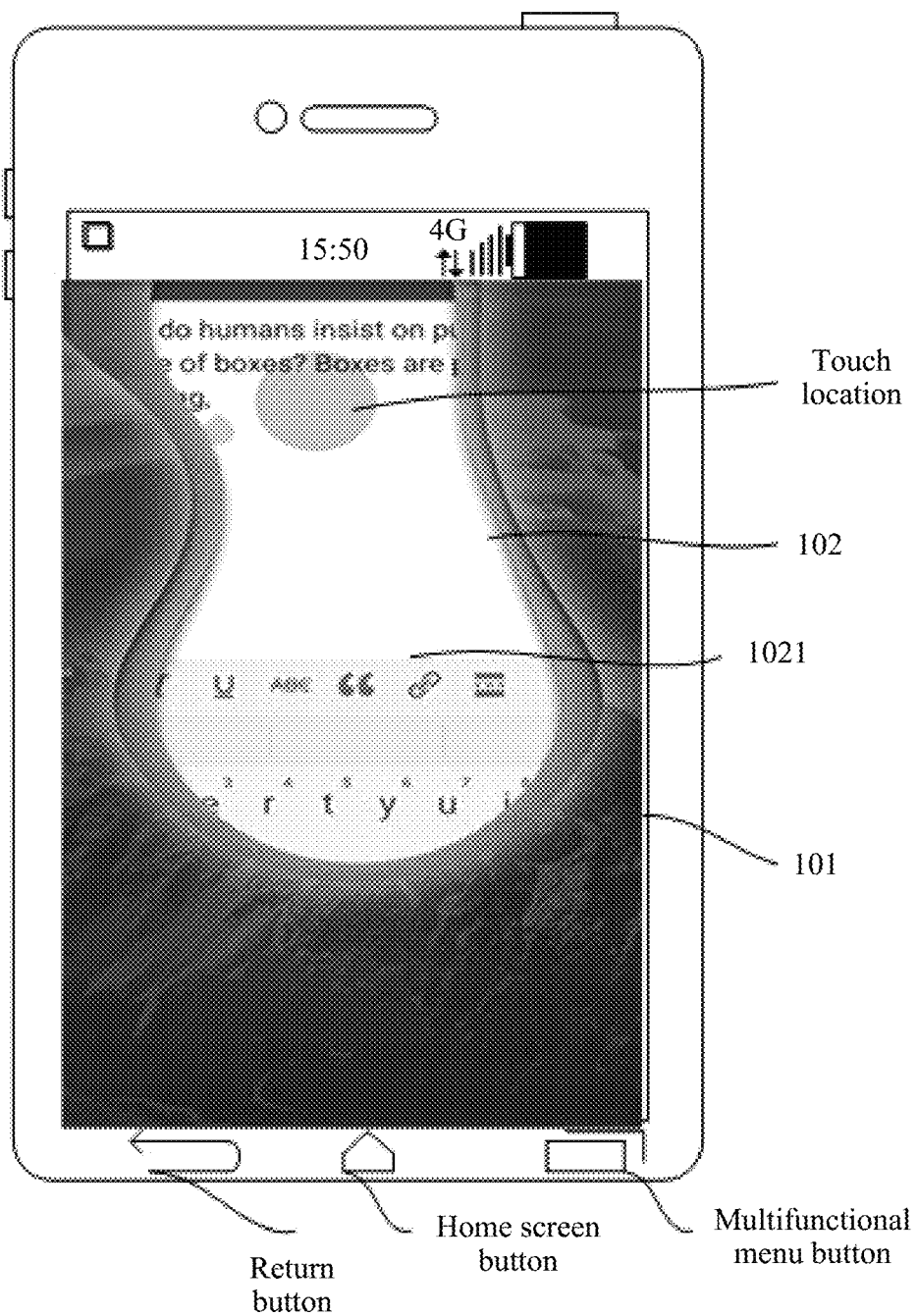
FIG. 6a is a schematic switching diagram 1 of an application switching method according to an embodiment of the present disclosure.
Figure 6B:
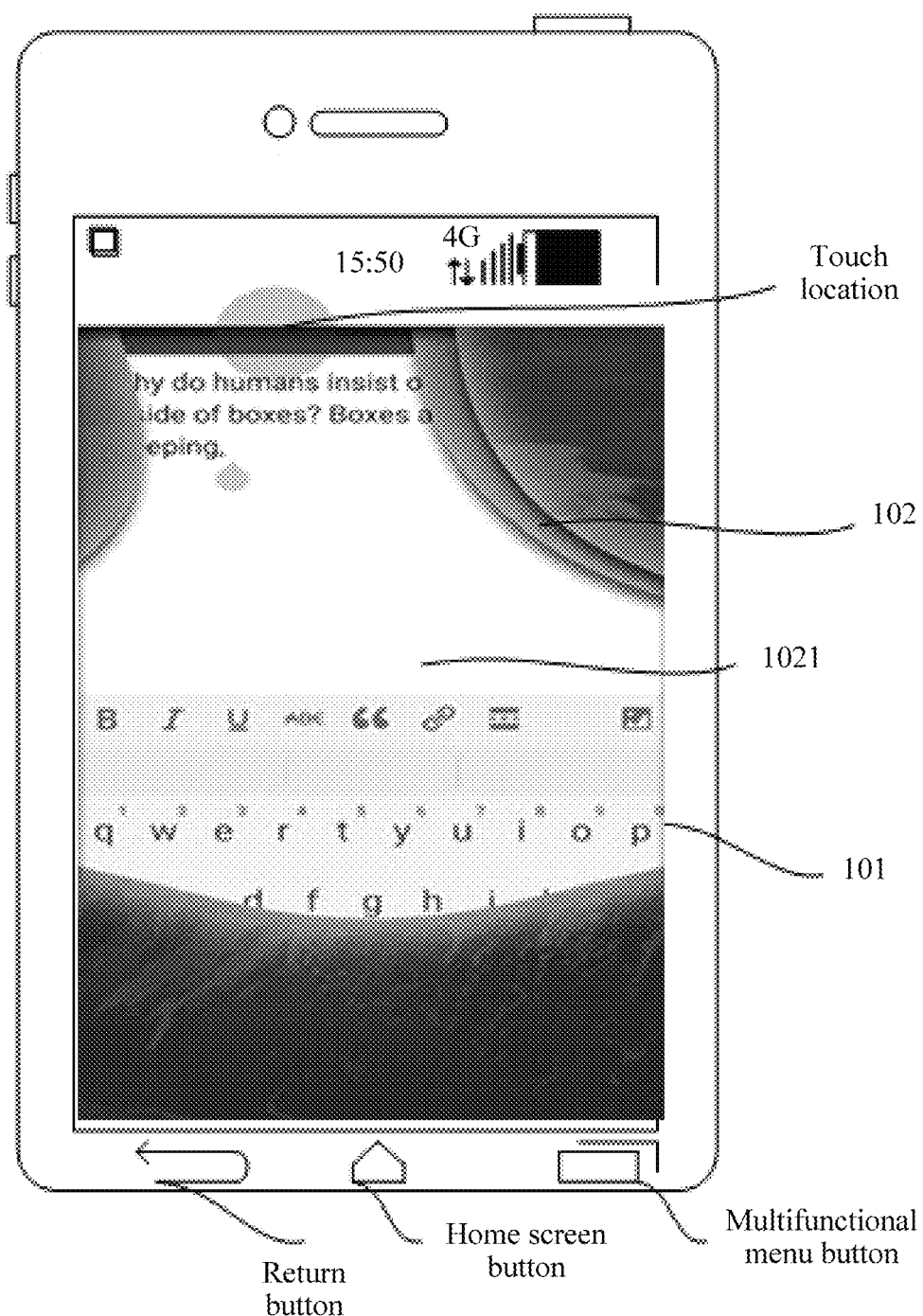
FIG. 6b is a schematic switching diagram 2 of an application switching method according to an embodiment of the present disclosure.
Figure 6C:
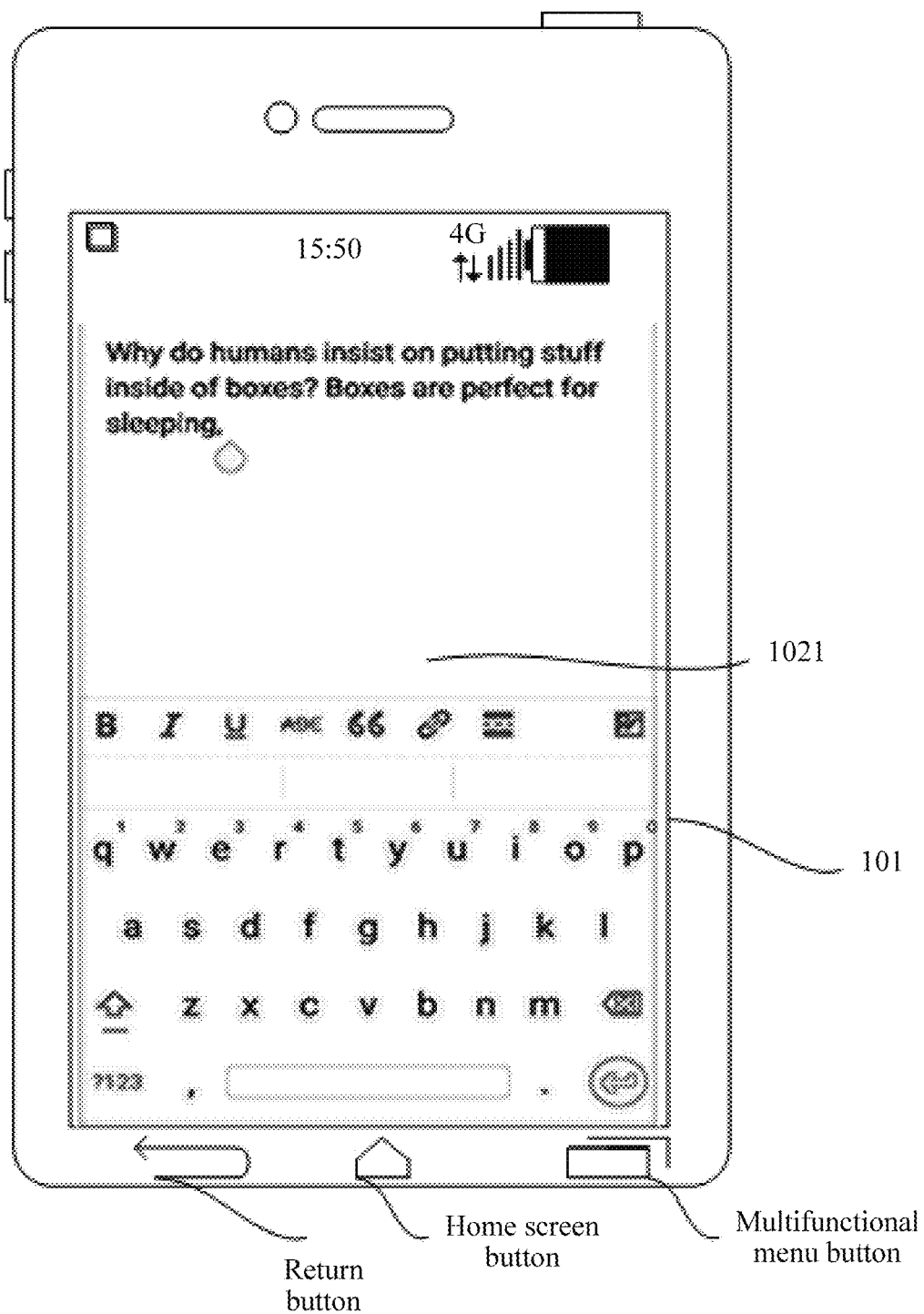
FIG. 6c is a schematic switching diagram 3 of an application switching method according to an embodiment of the present disclosure.

For example, as shown in FIG. 6a, a first application 1021 displayed in a first display window 102 in a current display interface 101 of the electronic device is a chat interface. As shown in FIG. 6b, when the touch location moves to a target location (e.g., a touchscreen edge), the electronic device controls the first display window 102 to be gradually enlarged in a first preset time until the first display window 102 totally covers the current display interface 101. In this way, the first application 1021 is totally displayed in the current display interface 101 of the electronic device, as shown in FIG. 6c. It can be learned from FIG. 6c that, when the first application 1021 is totally displayed in the current display interface 101 of the electronic device, the first display window 102 totally disappears from the current display interface 101.

A display method provided in this embodiment of the present disclosure may further implement switching between applications of the electronic device. In this embodiment of the present disclosure, the first preset time is not limited, and the first preset time may be 5 s to 6 s.

Figure 7:
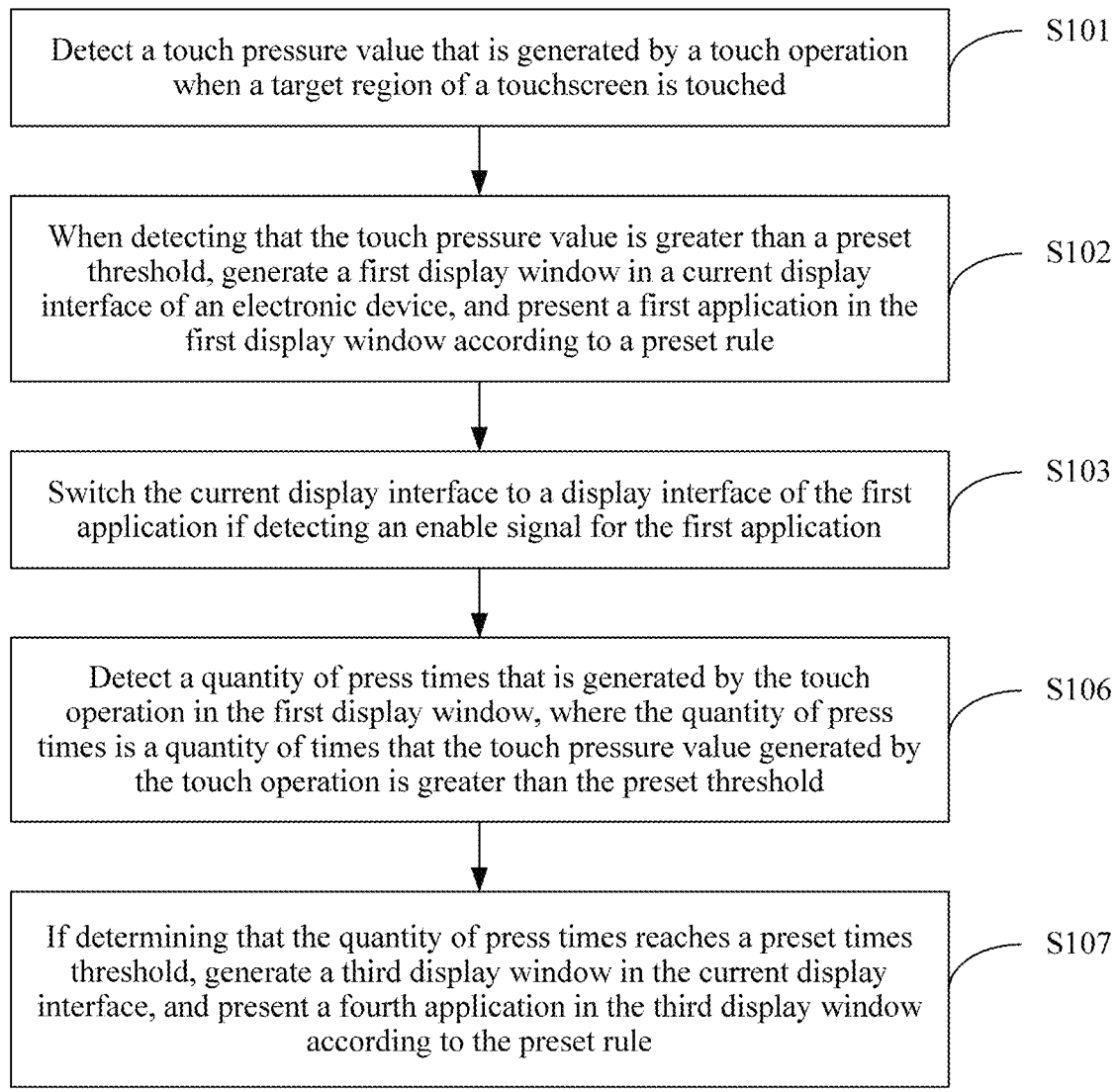
FIG. 7 is a schematic flowchart 4 of an application switching method according to an embodiment of the present disclosure.

Optionally, with reference to FIG. 3, as shown in FIG. 7, the method provided in this embodiment of the present disclosure further includes the following steps.

S106. The electronic device detects a quantity of press times that is generated by the touch operation in the first display window, where the quantity of press times is a quantity of times that the touch pressure value generated by the touch operation is greater than the preset threshold.

S107. If determining that the quantity of press times reaches a preset times threshold, the electronic device generates a third display window in the current display interface, and presents a fourth application in the third display window according to the preset rule, where a preset priority of the fourth application is lower than a preset priority of an application displayed in a last display window that is generated in the current display interface before the preset times threshold is reached.

Optionally, after step S107, if an enable signal corresponding to the third application is detected, the current display interface may be switched to a display interface of the third application based on step S1031.

Optionally, in this embodiment of the present disclosure, the preset times threshold is not limited, and the preset times threshold may be set by a vendor before delivery of the electronic device, or may be customized by the user.

Specifically, in a use process, the fourth application and the application that is displayed in the last display window generated in the current display interface change with different preset times thresholds, and the preset times threshold may be specifically set as actually needed.

For example, if the preset times threshold is 2, the last window generated in the current display interface before the preset times threshold is reached is the first display window, and the fourth application is the first application.

If the preset times threshold is 3, the last display window generated in the current display interface before the preset times threshold is reached is the second display window, and the fourth application is the second application.

Therefore, the third application in this embodiment of the present disclosure may be the same as the first application, or may be the same as the second application, or may be another application other than the first application and the second application. The third application may be determined based on the preset times threshold.

The third display window may cover the last display window that is generated in the current display interface before the preset times threshold is reached, or may be located in a region that is in the current display interface and that is different from a region of the last display window that is generated in the current display interface before the preset times threshold is reached, or may be located in the last display window that is generated in the current display interface before the preset times threshold is reached.

For example, if the application displayed in the last display window that is generated in the current display interface before the preset times threshold is reached is the application 2, when the preset times threshold is reached, the application displayed in the third display window is the application 3.

Figure 8:
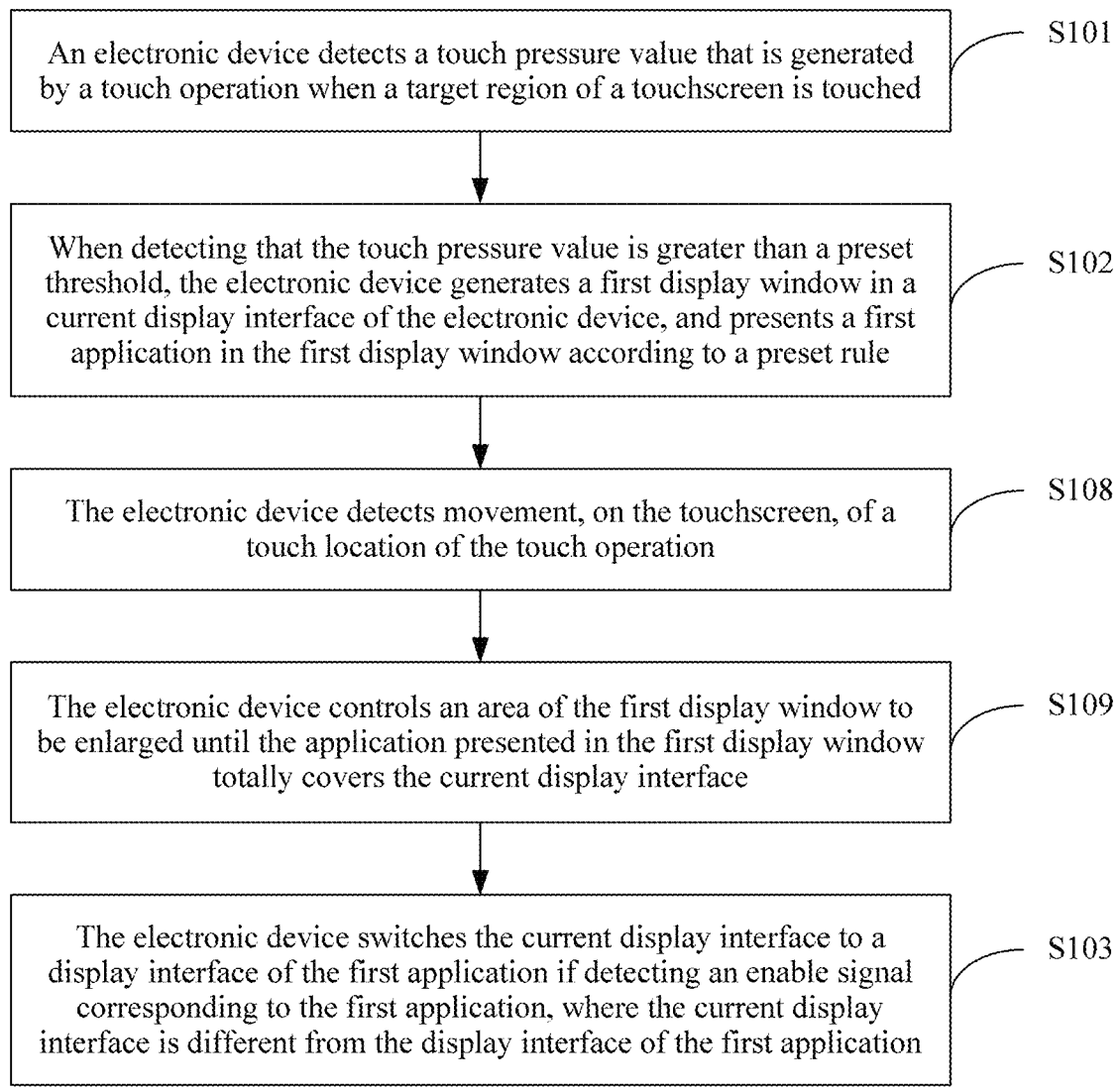
FIG. 8 is a schematic flowchart 5 of an application switching method according to an embodiment of the present disclosure.

With reference to FIG. 3, as shown in FIG. 8, before step S103, the method provided in this embodiment of the present disclosure further includes the following steps.

S108. The electronic device detects movement, on the touchscreen, of a touch location of the touch operation.

S109. The electronic device controls an area of the first display window to be enlarged until the display interface of the application presented in the first display window totally covers the current display interface.

In one aspect, in this embodiment of the present disclosure, the area of the first display window changes with the touch pressure value at the touch location of the touch operation. Before the area of the first display window is increased to the preset area, the electronic device controls an increasing speed of the area of the first display window to be proportional to the touch pressure value at the touch location. After the area of the first display window is increased to the preset area, the electronic device controls the increasing speed of the area of the first display window to gradually decrease until the first display window covers the current display interface. When the first display window covers the current display interface, the increasing speed of the area of the first display window changes to 0.

Figure 9:
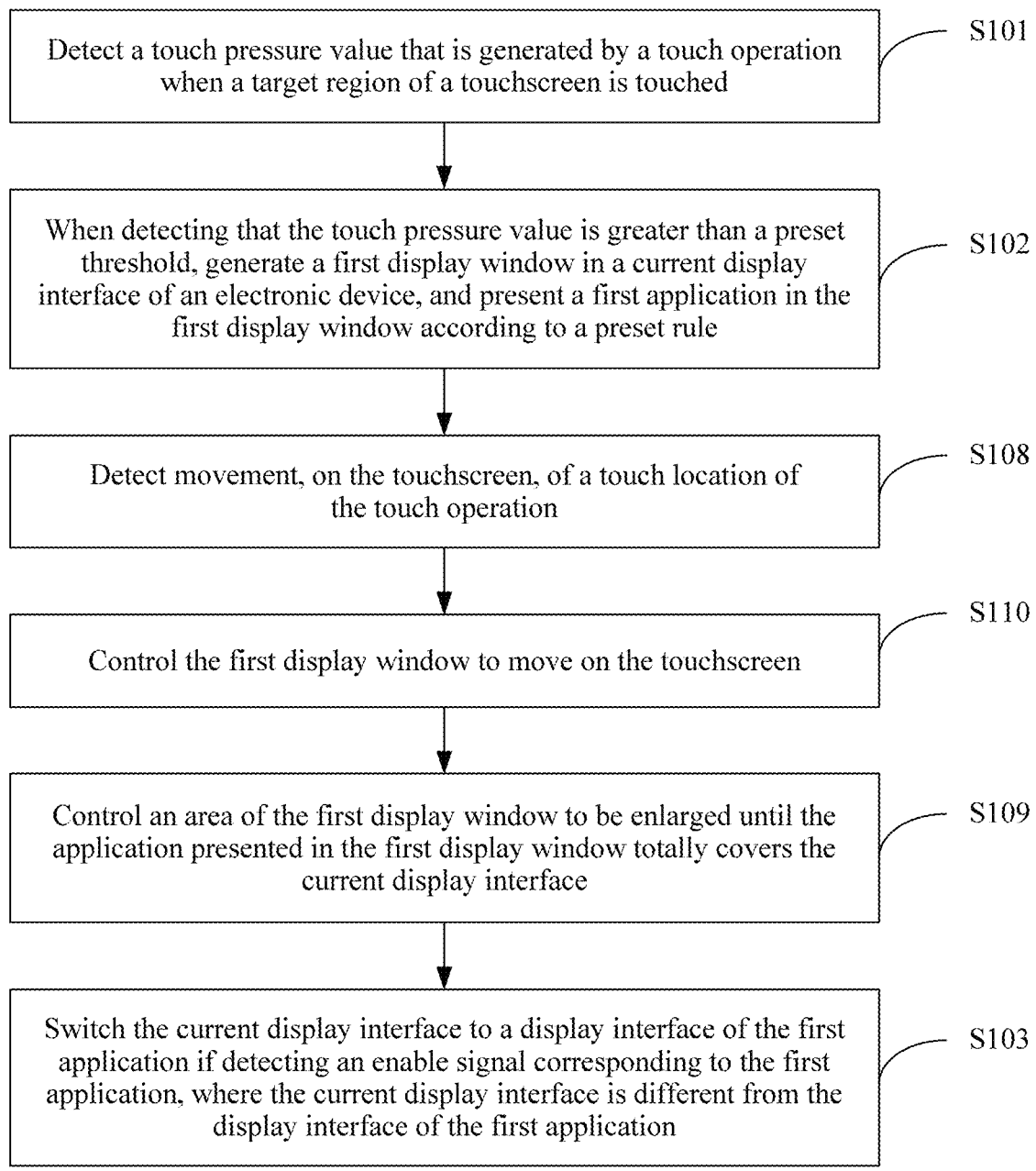
FIG. 9 is a schematic flowchart 6 of an application switching method according to an embodiment of the present disclosure.

With reference to FIG. 7, as shown in FIG. 9, in this embodiment of the present disclosure, after step S108, the method further includes the following step.

S110. Control the first display window to move on the touchscreen.

Step S109 and step S110 in this embodiment of the present disclosure may be simultaneously performed. In other words, the area of the first display window changes with the touch pressure value during movement.

It may be understood that, an interface element that is of the current display interface and that is covered by the first display window when the first display window moves is covered by the application displayed in the first display window. In addition, with movement of the first display window on the touchscreen, content that is of the first application and that is at different locations may be displayed by using the first display window.

Figure 10A:
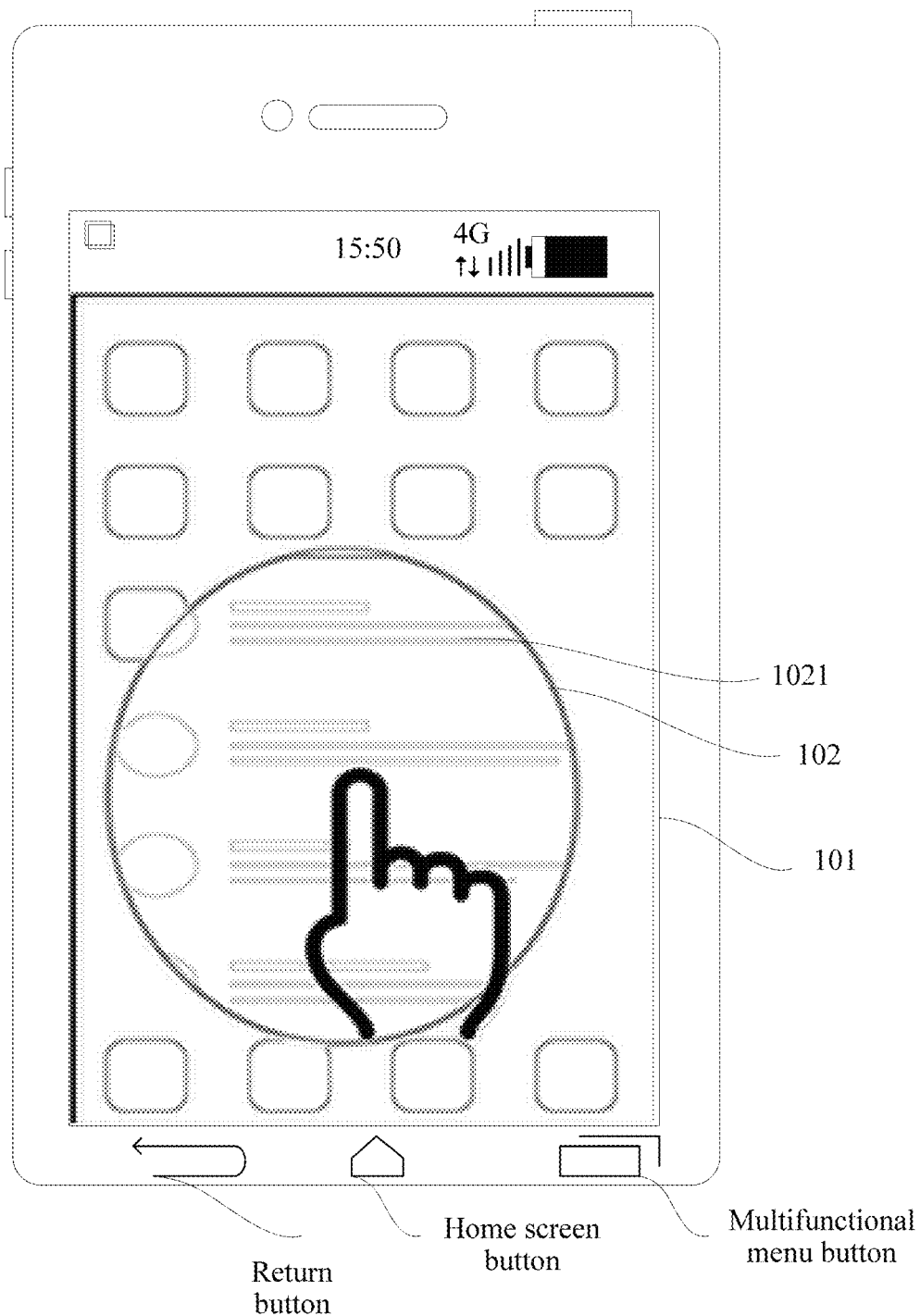
FIG. 10a is a schematic diagram 1 of moving a first display window according to an embodiment of the present disclosure.
Figure 10B:
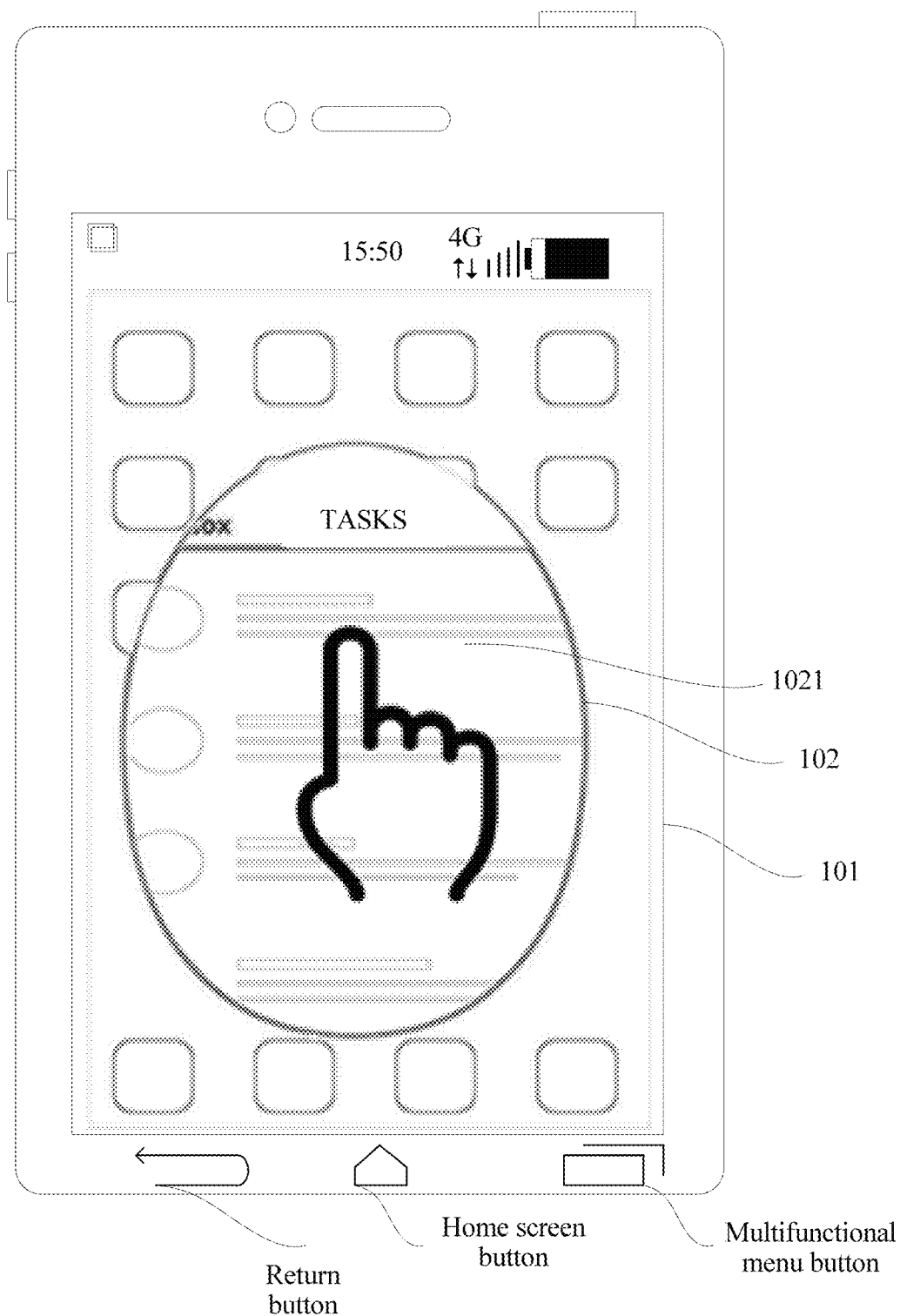
FIG. 10b is a schematic diagram 2 of moving a first display window according to an embodiment of the present disclosure.
Figure 10C:
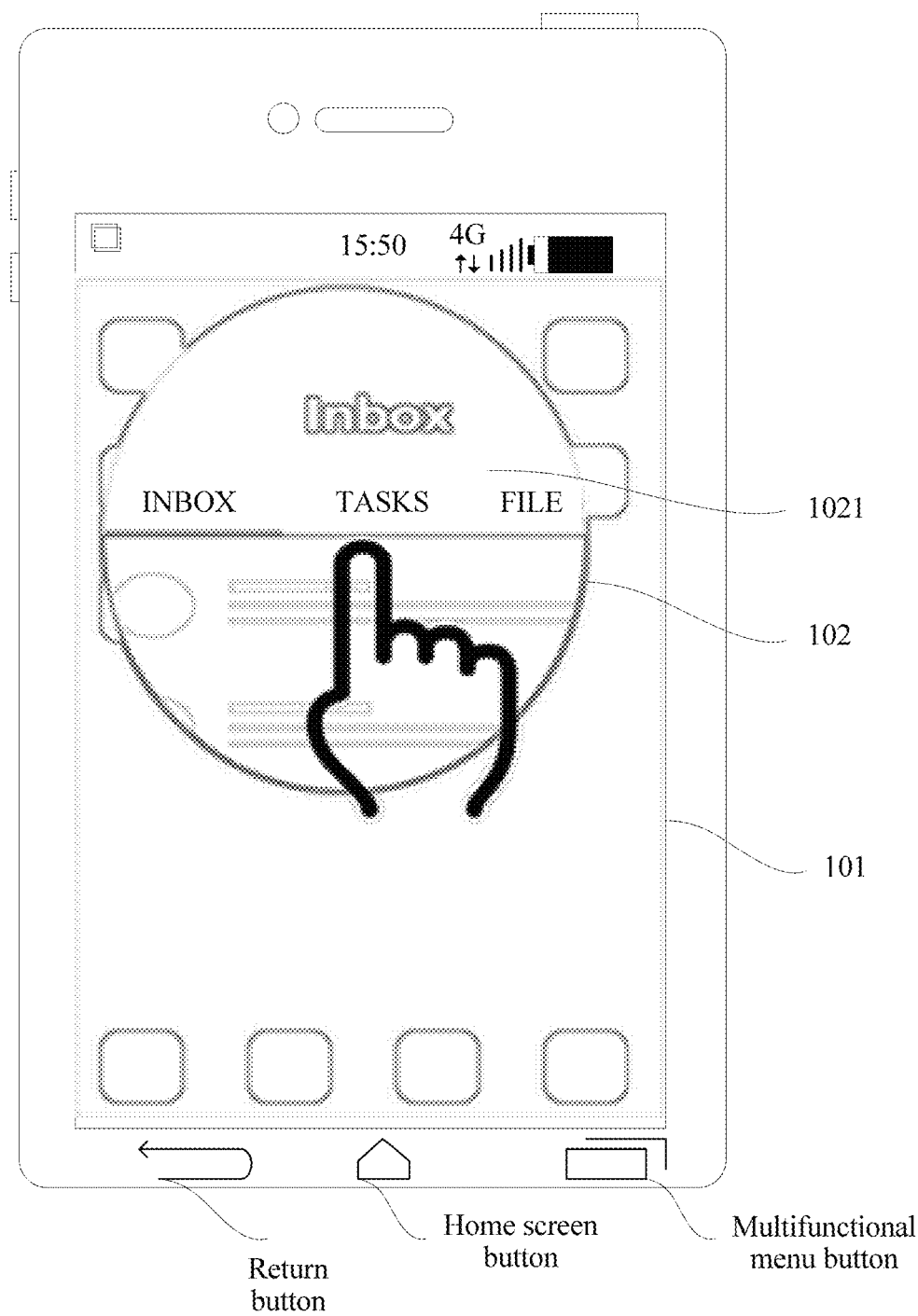
FIG. 10c is a schematic diagram 3 of moving a first display window according to an embodiment of the present disclosure.

As shown in FIG. 10a to FIG. 10c, when a first display window 102 is located at a location shown in FIG. 10a, an application 1021 displayed in the first display window 102 is an application located in the first display window 102; with movement of the first display window 102 in a current display interface 101, an area of the first display window 102 is gradually increased, and content of the application displayed in the first display window 102 changes. This is because a location of the application 1021 in the current display interface 101 is fixed, and when the first display window 102 moves, a region that is of a display interface of the application 1021 and that corresponds to the first display window changes, so that content that is of the application 1021 and that is at different locations can be displayed by moving the first display window 102, as shown in FIG. 10b and FIG. 10c.

Optionally, step S108 may be implemented in the following manner.

S1081. Cover, along a movement direction of the first display window by using the application displayed in the first display window, an interface element that is of the current display interface and that is covered when the first display window moves.

S1082. Re-display, along a direction reverse to the movement direction of the first display window, an interface element that is of the current display interface and that is covered by the first display window before the first display window moves.

Figure 11A:
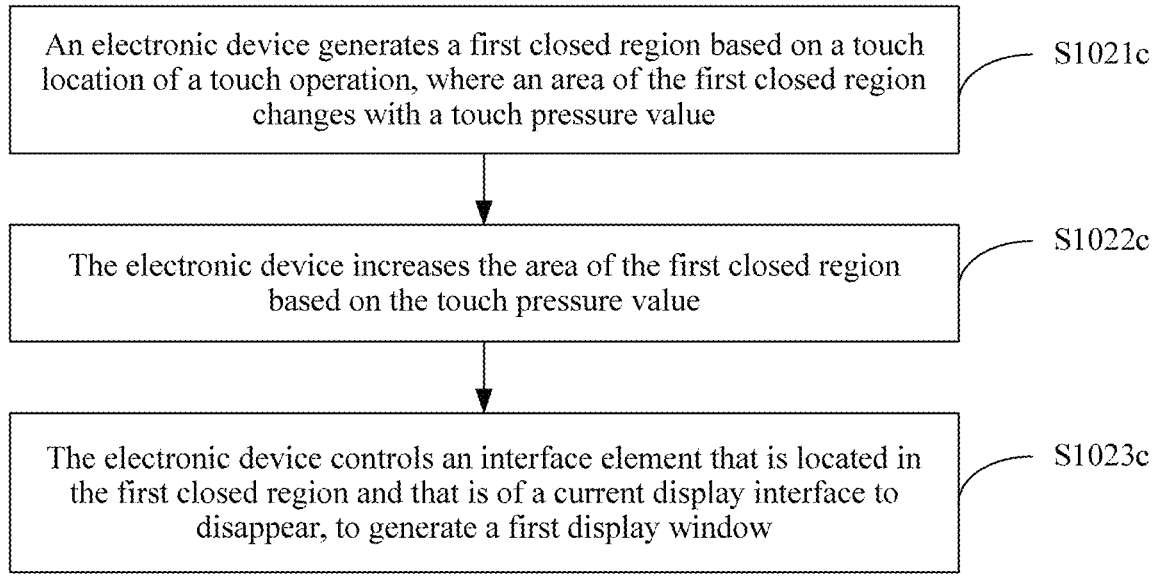
FIG. 11a is a schematic flowchart 6 of an application switching method according to an embodiment of the present disclosure.

Optionally, with reference to FIG. 3, as shown in FIG. 11a, step S102 provided in this embodiment of the present disclosure may be implemented in the following manner.

S1021c. The electronic device generates a first closed region based on a touch location of the touch operation, where an area of the first closed region changes with the touch pressure value, and the first closed region includes an interface element that is located in the first closed region and that is of the current display interface.

S1022c. The electronic device increases the area of the first closed region based on the touch pressure value.

S1023c. The electronic device controls the interface element that is located in the first closed region and that is of the current display interface to disappear, to generate the first display window.

Specifically, with reference to FIG. 11a, step S1021c in this embodiment of the present disclosure may be further implemented in the following manner.

S1021c1. The electronic device detects a gesture outline of the touch operation on the touchscreen.

S1021c2. The electronic device generates a first closed curve by using the gesture outline as a center, where the first closed curve includes the gesture outline.

S1021c3. Gradually increase an area of the first closed curve based on the touch pressure value to gradually increase the area of the first closed region, and determine a region bounded by the first closed curve as the first closed region.

Figure 11B:
FIG. 11b is a schematic diagram 1 of generating a first display window according to an embodiment of the present disclosure.
Figure 11C:
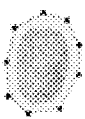
FIG. 11c is a schematic diagram 2 of generating a first display window according to an embodiment of the present disclosure.
Figure 11D:
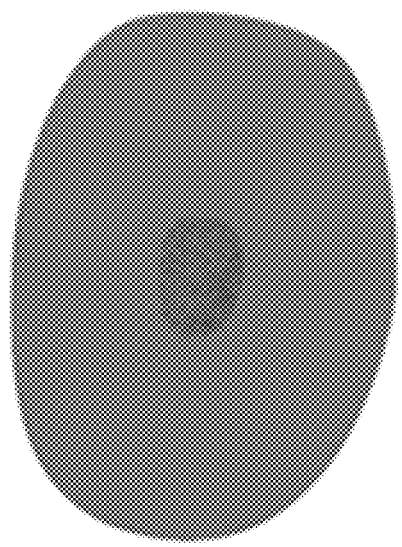
FIG. 11d is a schematic diagram 3 of generating a first display window according to an embodiment of the present disclosure.

As shown in FIG. 11b, when the electronic device detects that the touchscreen is touched, a gesture outline of a touch operation performed on the touchscreen of the electronic device is shown in FIG. 11b. A plurality of tracing points including the gesture outline are generated by using the gesture outline as a center, and the plurality of tracing points are connected by using a smooth curve, to generate a first closed curve, as shown in FIG. 11c. An area of a region bounded by the first closed curve in FIG. 11c is gradually increased based on a touch pressure value. When the area of the region bounded by the first closed curve is gradually increased based on the touch pressure value, a first display window is formed, as shown in FIG. 11d, and a first application corresponding to the first display window is gradually displayed in the first display window.

The solutions provided in the embodiments of the present disclosure are mainly described above from a perspective of an electronic device. It may be understood that, to implement the foregoing functions, an electronic device provided in the embodiments of the present disclosure includes corresponding hardware structures and/or software modules for performing the functions. A person skilled in the art should be easily aware that, units and algorithm steps in the examples described with reference to the embodiments disclosed in this specification may be implemented in a form of hardware or a combination of hardware and computer software in the present disclosure. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the electronic device or the like may be divided into function modules based on the foregoing method example. For example, the function modules may be divided according to the corresponding functions, or two or more functions may be integrated into one processing module. The integrated module may be implemented by hardware, or may be implemented by a software function module. It should be noted that, division of the modules in the embodiments of the present disclosure is an example, and is merely division of logical functions. During actual implementation, another division manner may be used.

Figure 12A:
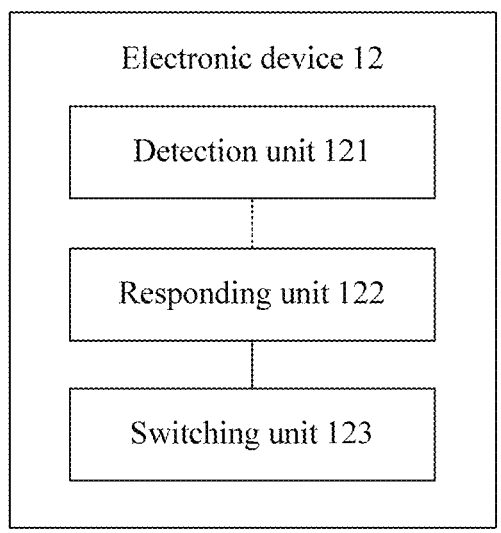
FIG. 12a is a schematic structural diagram 1 of an electronic device according to an embodiment of the present disclosure.

When the function modules are divided according to the corresponding functions, FIG. 12a is a possible schematic structural diagram of the electronic device in the foregoing embodiment. The electronic device includes a detection unit 121, a responding unit 122, and a switching unit 123. The detection unit 121 is configured to support the electronic device in performing processes S101, S106, and S108 (S1081 and S1082) described in the foregoing embodiment. The responding unit is configured to support the electronic device in performing processes S102 (for example, 1021a, 1022a, S1021a1, S1021a2, S1021a3, S1021b, S1022b, S1022b1, S1022b2, S1021c, S1022c, S1023c, S1021c1, S1021c2, and S1021c3), S102-1, S104, S107, S109, and S110 described in the foregoing embodiment. The switching unit is configured to support the electronic device in performing processes S103 (e.g., S1031) and S105 described in the foregoing embodiment. All related content of steps in the foregoing method embodiment may be cited in function descriptions of corresponding function modules, and details are not described herein.

Figure 12B:
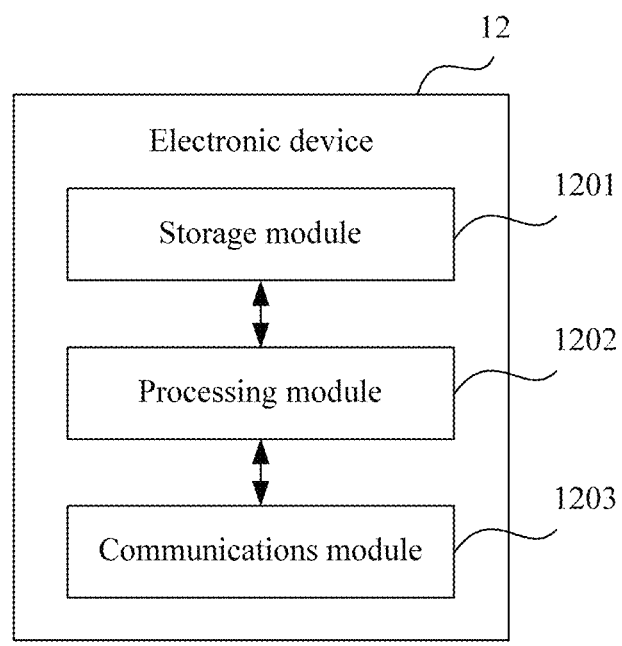
FIG. 12b is a schematic structural diagram 2 of an electronic device according to an embodiment of the present disclosure.

When an integrated unit is used, FIG. 12b is a possible schematic structural diagram of the electronic device in the foregoing embodiment. The electronic device 12 includes a processing module 1202 and a communications module 1203. The processing module 1202 is configured to control and manage actions of the electronic device. For example, the processing module 1202 is configured to support the electronic device in performing processes S101, S102 (for example, 1021a, 1022a, S1021a1, S1021a2, S1021a3, S1021b, S1022b, S1022b1, S1022b2, S1021c, S1022c, S1023c, S1021c1, S1021c2, and S1021c3), S102-1, S103, S104, S105, S106, S107, S108, S109, and S110 described in the foregoing embodiment. The communications module 1203 is configured to support the electronic device in communicating with another network entity, for example, communicating with a base station. The electronic device may further include a storage module 1201, configured to store program code and data of the electronic device.

The processing module 1202 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor or the controller may implement or execute various example logical blocks, modules, and circuits described with reference to content disclosed in the present disclosure. Alternatively, the processor may be a combination for implementing a computing function, for example, a combination of one or more microprocessors, or a combination of a DSP and a microprocessor. The communications module 1203 may be a transceiver, a transceiver circuit, a communications interface, or the like. The storage module 1201 may be a memory.

Figure 12C:
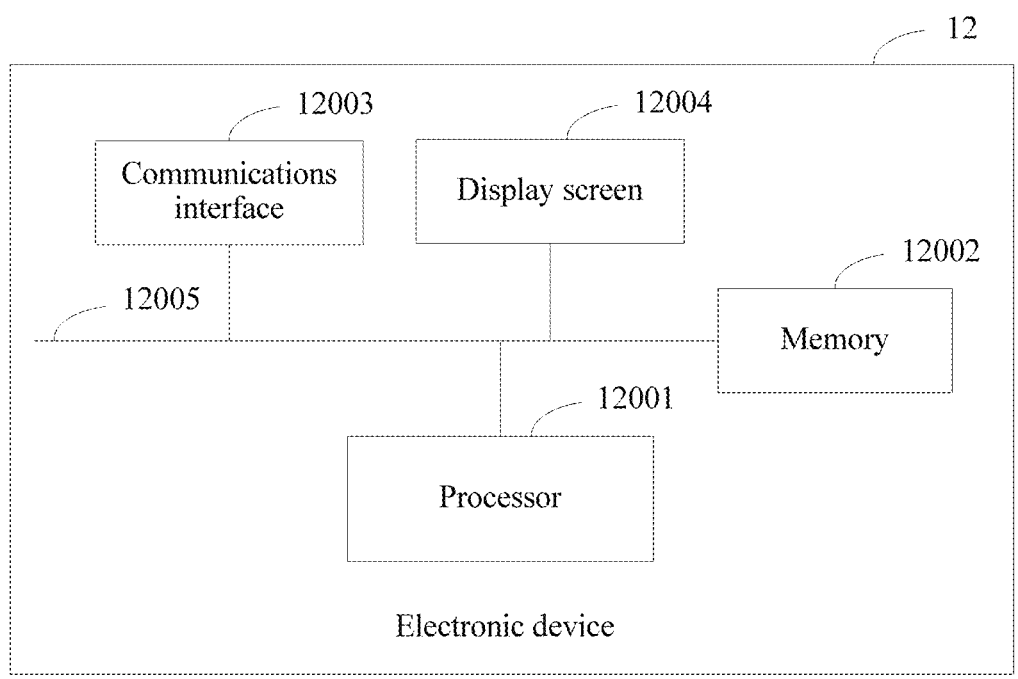
FIG. 12c is a schematic structural diagram 3 of an electronic device according to an embodiment of the present disclosure.

When the processing module 1202 is a processor 12001, the communications module 1203 is a transceiver, and the storage module 1201 is a memory, the electronic device in this embodiment of the present disclosure may be an electronic device shown in FIG. 12*c*.

As shown in FIG. 12*c*, the electronic device 12 includes the processor 12001, a communications interface 12003, a memory 12002, and a display screen 12004. The memory 12002 is configured to store a computer-executed instruction. The processor 12001 is connected to the memory 12002 by using a system bus 12005. When the electronic device 12 runs, the processor 12001 executes the computer-executed instruction stored in the memory 12002, so that the electronic device 12 performs processes S101 to S104 in FIG. 3 and processes S101 to S106 in FIG. 5*a*. The display screen 12004 is configured to display a current display interface and a display interface of a first application, a display interface of a second application, or a display interface of a third application, and/or configured to perform another process of the technology described in the specification.

The communications interface 12003 may be a transceiver, a transceiver circuit, or a communications interface. For example, the communications interface 12003 of the electronic device may be specifically a transceiver on the electronic device. The transceiver may be a wireless transceiver. For example, the wireless transceiver may be an antenna or the like of the electronic device. The processor 12001 receives data from and sends data to another device such as a base station by using the communications interface 12003. The electronic device 12 may further include the memory 12002, configured to store program code and data of the electronic device 12.

The memory 12002 may include a volatile memory, for example, a random access memory (RAM). Alternatively, the memory 12002 may include a non-volatile memory, for example, a read-only memory (ROM), a flash memory, a hard disk drive (HDD), or a solid-state drive (SSD). Alternatively, the memory 12002 may include a combination of the foregoing types of memories.

The system bus 12005 may include a data bus, a power bus, a control bus, a signal status bus, and the like. For clear description in this embodiment, various buses are denoted as the system bus 12005 in FIG. 12*c*.

The processor 12001 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor or the controller may implement or execute various example logical blocks, modules, and circuits described with reference to content disclosed in the present disclosure. Alternatively, the processor may be a combination for implementing a computing function, for example, a combination of one or more microprocessors, or a combination of a DSP and a microprocessor.

The processor 12001 may be a dedicated processor. The dedicated processor may include at least one of a baseband processing chip, a radio frequency processing chip, and the like. Further, the dedicated processor may further include a chip with another dedicated processing function of user equipment.

An embodiment of the present disclosure provides a graphical user interface (GUI) on an electronic device with a touchscreen. The electronic device includes the touchscreen, a memory, and one or more processors configured to execute one or more programs stored in the memory. The graphical user interface includes a current display interface, a first display window, and a first application.

In one aspect, the current display interface is displayed in response to detected triggering of a user on the touchscreen of the electronic device.

In another aspect, in response to a touch pressure value that is generated when a target region of the touchscreen is touched by a touch operation of the user, when the touch pressure value is greater than a preset threshold, the first display window is displayed in the current display interface, and the first application is presented in the first display window.

It should be noted that, the current display interface may be a display interface when the user presses a home button or a power button or the user operates any application, for example, a display interface appearing when a browser is tapped, or a display interface when a picture is opened.

Optionally, the graphical user interface further includes a second display window and a second application.

In response to a non-enable signal corresponding to the first application, the second display window is displayed in the current display interface, and the second application is presented in the second display window. A preset priority of the second application is lower than a preset priority of the first application.

Optionally, an area of a first display interface is increased. In response to movement, on the touchscreen, of a touch location of the touch operation, an area of the first display window is gradually increased until a display interface of the first application totally covers the current display interface.

Optionally, the graphical user interface further includes a third display window and a third application. In response to a quantity of press times that is generated by the touch operation in the first display window, when the quantity of press times reaches a preset times threshold, the third display window is displayed in the current display interface, and the third application is presented in the third display window. The quantity of press times is a quantity of times that the touch pressure value generated by the touch operation is greater than the preset threshold, and a preset priority of the third application is lower than a preset priority of a last application displayed in the first display window before the preset times threshold is reached.

It should be noted that, the electronic device in this embodiment may be a smart terminal. For example, the electronic device may be the mobile phone in the embodiment shown in FIG. 2. A display of the electronic device may be the display screen 173 in the mobile phone shown in FIG. 2. The touchscreen of the electronic device may be the touch panel 142 in the mobile phone shown in FIG. 2. The memory and the processor of the electronic device may be the memory 120 and the processor 180 in the mobile phone shown in FIG. 2.

The graphical user interface provided in this embodiment of the present disclosure is illustrated below by using FIG. 13a, FIG. 13b, FIG. 5c, FIG. 5d, and FIG. 6a to FIG. 6c as examples. In illustration of FIG. 13a, FIG. 13b, FIG. 5c, FIG. 5d, and FIG. 6a to FIG. 6c, for example, the electronic device in this embodiment is a smart terminal.

Figure 13A:
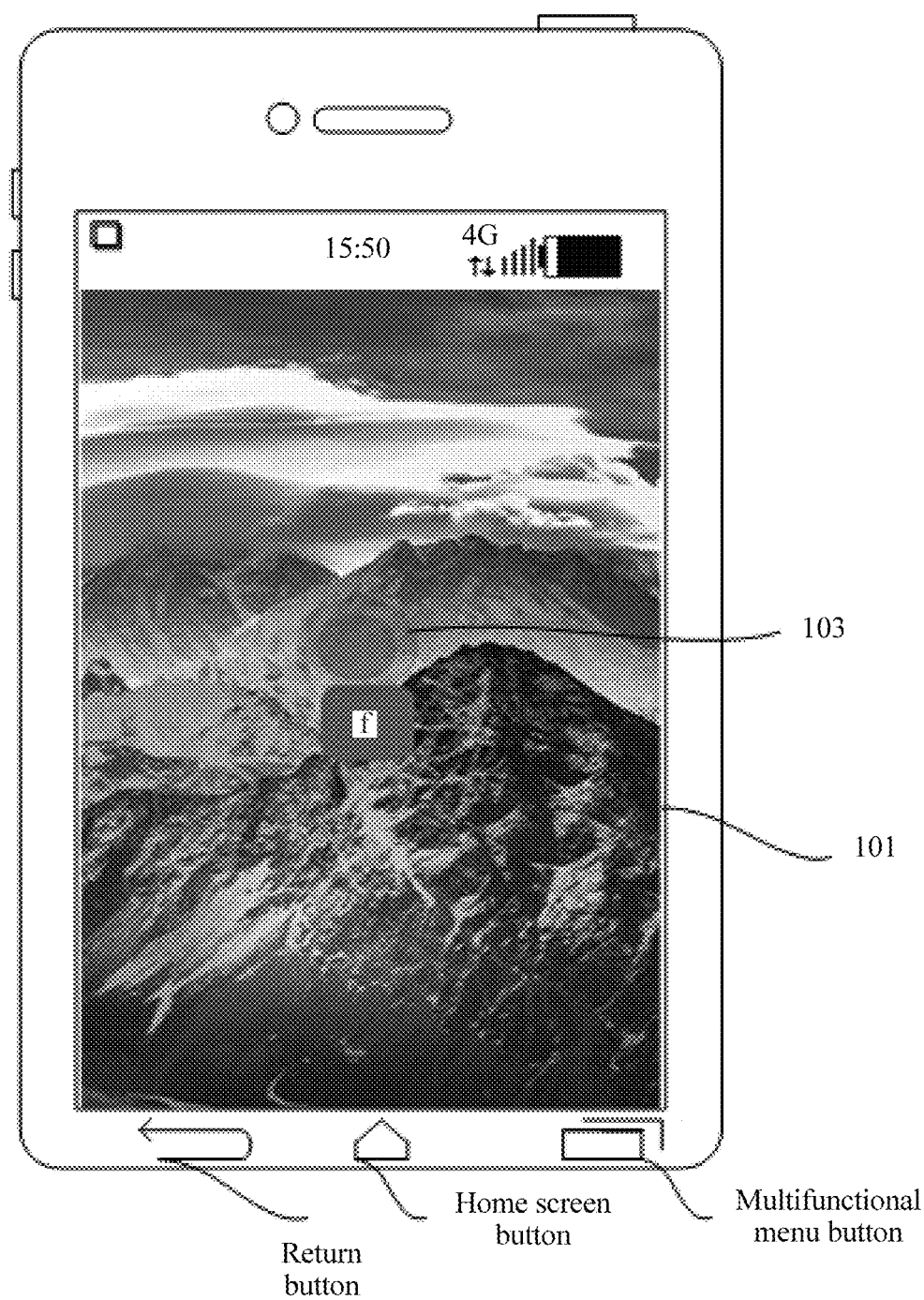
FIG. 13a is a schematic diagram 1 of a graphical user interface according to an embodiment of the present disclosure.
Figure 13B:
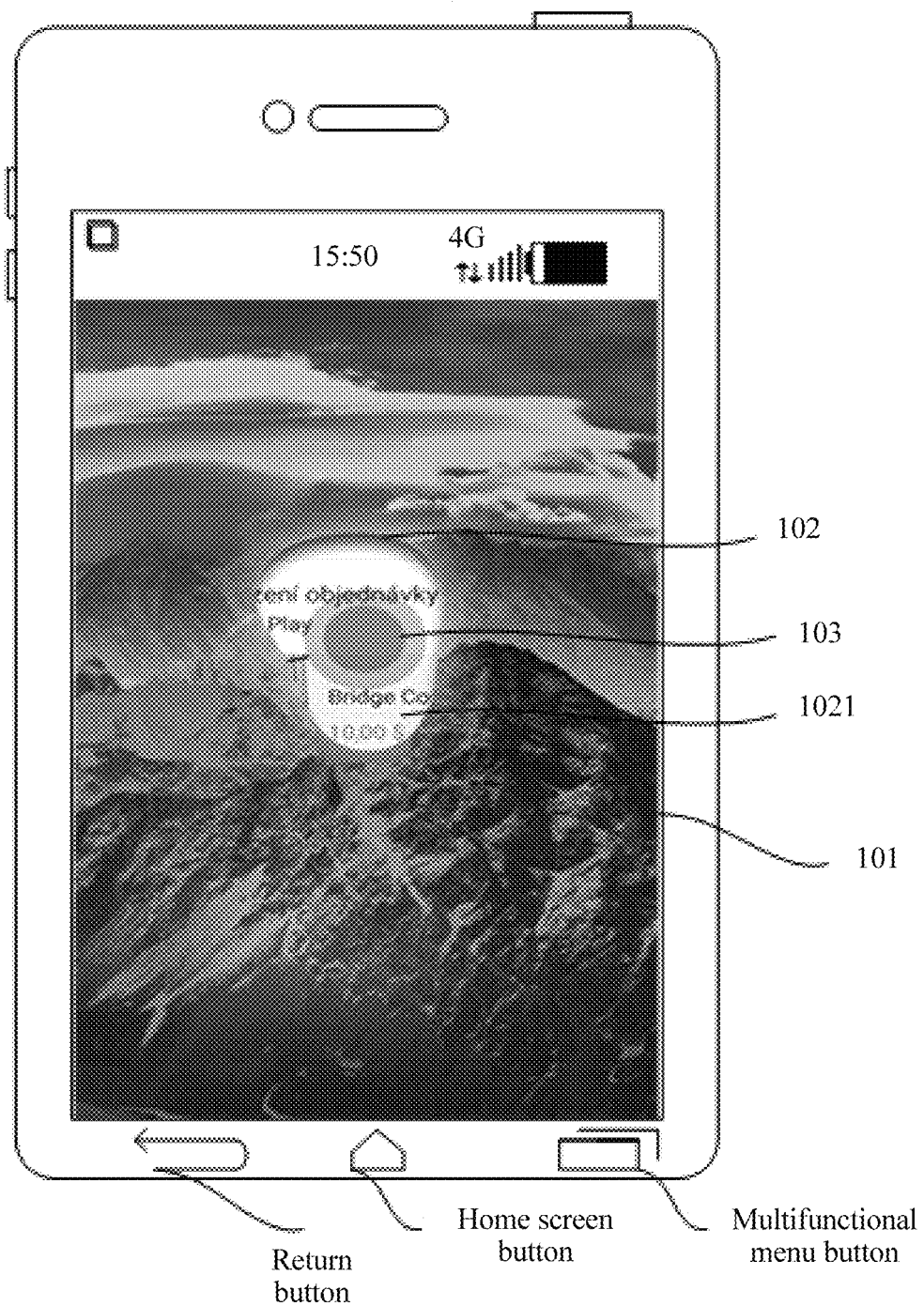
FIG. 13b is a schematic diagram 2 of a graphical user interface according to an embodiment of the present disclosure.

FIG. 13a shows a current display interface of the smart terminal. The current display interface is a home screen. The electronic device responds to a touch location 103 of a touch operation of a user on the touchscreen of the electronic device. As shown in FIG. 13b, when the user touches the touchscreen of the electronic device, the smart terminal detects triggering of the user on the touchscreen of the electronic device, and in response to the triggering, the smart terminal displays a first display window 102 in the current display interface 101 of the electronic device, and displays, in the first display window 102, content that is of a display interface of a first application 1021 and that corresponds to the first display window 102. As shown in FIG. 5c, with a change of a touch pressure value on the touchscreen of the electronic device, an area of the first display window 102 is gradually increased, and increasing content that is of the display interface of the first application 1021 and that corresponds to the first display window is displayed. As shown in FIG. 5d, when the first display window 102 is enlarged, if the electronic device detects a non-enable signal that is of the user and that corresponds to the first application, the electronic device generates a second display window 103 in the current display interface, to display a second application 1022. As shown in FIG. 6a, as the first application 1021 totally disappears, increasing content of the second application 1022 is displayed in the first display window 102. The first display window in this embodiment of the present disclosure may move on the touchscreen of the electronic device with movement of the touch location. As shown in FIG. 6b, the first display window 102 moves in the current display interface 101 with movement of the touch location. As shown in FIG. 6c, when the touch location moves to a target location, and the touch operation is released from the touchscreen of the electronic device, the area of the first display window is gradually increased until the first display window totally disappears, the second application is displayed in a display interface of the electronic device in full screen, and finally, an interface displayed in the display interface of the electronic device is a display interface corresponding to the second application.

It should be noted that, after the user triggers the touchscreen of the electronic device or the display interface of the second application is displayed on the electronic device by performing a touch operation, as shown in FIG. 13a, FIG. 13b, FIG. 5c, FIG. 5d, and FIG. 6a to FIG. 6c, the user may first press the "home" button to return to a home screen of the smart terminal, for example, as shown in FIG. 13a, and then the user further triggers the touchscreen of the electronic device on the home screen of the smart terminal to re-preview an application, and process the re-previewed application.

An embodiment of the present disclosure further provides a computer-readable storage medium. The computer-readable storage medium stores one or more programs, the one or more programs include a computer-executed instruction, and when at least one processor of an electronic device executes the computer-executed instruction, the electronic device performs processes S101, S102 (e.g., 1021a, 1022a, S1021a1, S1021a2, S1021a3, S1021b, S1022b, S1022b1, S1022b2, S1021c, S1022c, S1023c, S1021c1, S1021c2, and S1021c3), S102-1, S103, S104, S105, S106, S107, S108, S109, and S110 described in the foregoing embodiment. For a specific application switching method, refer to related descriptions in the foregoing embodiment. Details are not described herein again.

It may be clearly understood by a person skilled in the art that, for the purpose of convenient and brief description, only division of the foregoing function modules is illustrated. In actual application, the foregoing functions can be allocated to and implemented by different function modules as needed. In other words, an internal structure of an apparatus is divided into different function modules to implement all or some of the foregoing described functions. For a detailed working process of the foregoing described system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one position, or may be distributed on a plurality of network units. Some or all of the units may be selected as actually needed to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of a software function unit.

When the integrated unit is implemented in the form of the software function unit and sold or used as an independent product, the integrated unit may be stored in a computer-readable storage medium. Based on such an understanding, all or some of the technical solutions may be implemented in a form of a software product. The computer software product is stored in a storage medium, and includes instructions for instructing a computer device (which may be a personal computer, a server, a network device, or the like) to perform all or some of the steps of the methods in the embodiments of the present disclosure. The storage medium is a non-transitory (English: non-transitory) medium, and includes any medium that can store program code, such as a flash memory, a removable hard disk, a read-only memory, a random access memory, a magnetic disk, or an optical disc.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

The invention claimed is:

1. An application switching method, comprising:
   determining priority values for each of a plurality of applications;
   selecting a first application from the plurality of applications based on a first priority value, from the priority values, associated with the first application;
   detecting a touch pressure value that is generated by a touch operation when a target region of a touchscreen included in an electronic device is touched;
   when detecting that the touch pressure value is greater than a preset threshold:
     generating a first display window over a current display interface of the electronic device, and
     presenting the first application in the first display window, as a first preview of the first application, according to the first priority value;
   switching the current display interface to a display interface of the first application if an enable signal for the first application is detected; and
   when detecting a non-enable signal corresponding to the first application, generating a second display window, as a second preview of a second application, over the current display interface, wherein the first display window, presenting the first preview of the first application, and the second display window, presenting the second preview of the second application, are configured for simultaneous display over the current display interface.

2. The method according to claim 1, further comprising:
   determining the priority values of each application based on a basic attribute of each application, wherein the basic attribute of the application comprises at least one of: a use time of the application, a time point at which the application is installed, a frequency of using the application, a time at which the application is updated, a rank based on an initial of a name of the application, a memory space size occupied by the application when the application runs in the electronic device, a size of the application, a rank of an operating position at which the application is located on the electronic device a color similarity of an icon corresponding to the application, or a color similarity of a display interface corresponding to the application.

3. The method according to claim 1, wherein if the current display interface is a display interface of the second application, the method further comprises:
   obtaining a category to which each of at least one application that is running in the electronic device belongs;
   determining a target category from the category to which each application belongs, wherein the target category is the same as a category of the second application, and the target category comprises one or more application; and
   determining an application with a highest preset priority in the one or more applications as the first application.

4. The method according to claim 3, further comprising:
   when the first application is presented in the first display window according to the preset rule, presenting, in the first display window, another application that is other than the first application and that is in the at least one application that is running in the electronic device.

5. The method according to claim 1, wherein
   the second application is presented in the second display window according to a preset rule, wherein a preset priority of the second application is lower than a preset priority of the first application.

6. The method according to claim 5, further comprising:
   switching the current display interface to a display interface of the second application if an enable signal corresponding to the second application is detected.

7. The method according to claim 1, further comprising:
   if detecting that a touch location of the touch operation moves to a target location, and the touch operation is released from the touchscreen, controlling the first display window to be enlarged until the first display window totally covers the current display interface, and covering the current display interface by using the display interface of the first application displayed in the first display window.

8. The method according to claim 1, further comprising:
   detecting a quantity of press times that is generated by the touch operation in the first display window, wherein the quantity of press times is a quantity of times that the touch pressure value generated by the touch operation is greater than the preset threshold; and
   if determining that the quantity of press times reaches a preset times threshold, generating the second display window in the current display interface, and presenting the second application in the second display window according to a preset rule, wherein a preset priority of the second application is lower than a preset priority of an application displayed in a last display window that is generated in the current display interface before the preset times threshold is reached.

9. The method according to claim 1, wherein before the switching the current display interface to the display interface of the first application if the enable signal for the first application is detected, the method further comprises:
   detecting movement, on the touchscreen, of a touch location of the touch operation; and
   controlling the first display window to move on the touchscreen, and controlling an area of the first display window to be enlarged until the display interface of the application presented in the first display window totally covers the current display interface.

10. The method according to claim 9, wherein the controlling the first display window to move on the touchscreen comprises:
    covering, along a movement direction of the first display window by using the application displayed in the first display window, an interface element that is of the current display interface and that is covered when the first display window moves; and
    re-displaying, along a direction reverse to the movement direction of the first display window an interface element that is of the current display interface and that is covered by the first display window before the first display window moves.

11. The method according to claim 1, wherein the first priority value is a highest priority value from the priority values, and the first application is selected based on the highest priority value.

12. The method according to claim 1, wherein the first display window gradually increases in size as it is displayed over the current display interface until the current display interface is switched to the display interface of the first application.

13. An electronic device, comprising a touchscreen, one or more processors, a memory, and one or more programs, wherein the one or more programs are stored in the memory and configured to be executed by the one or more processors, the one or more processors execute the one or more programs stored in the memory, to perform execution comprising:

determining priority values for each of a plurality of applications;

selecting a first application from the plurality of applications based on a first priority value, from the priority values, associated with the first application;

detecting a touch pressure value that is generated by a touch operation when a target region of the touchscreen is touched;

when detecting that the touch pressure value is greater than a preset threshold:
generating a first display window over a current display interface of the electronic device, and
presenting the first application in the first display window, as a first preview of the first application, according to the first priority value;

switching the current display interface to a display interface of the first application if an enable signal for the first application is detected; and when detecting a non-enable signal corresponding to the first application, generating a second display window, as a second preview of a second application, over the current display interface, wherein the first display window, presenting the first preview of the first application, and the second display window, presenting the second preview of the second application, are configured for simultaneous display over the current display interface.

14. The electronic device according to claim 13, wherein the one or more processors are further configured to perform execution comprising:

determining the priority values of each application based on a basic attribute of each application, wherein the basic attribute of the application comprises at least one of: a use time of the application, a time at which the application is installed, a frequency of using the application, a time point at which the application is updated, a rank based on an initial of a name of the application, a memory space size occupied by the application when the application runs in the electronic device, a size of the application, a rank of an operating position at which the application is located on the electronic device, a color similarity of an icon corresponding to the application, or a color similarity of a display interface corresponding to the application.

15. The electronic device according to claim 13, wherein the one or more processors are further configured to perform execution comprising:

obtaining a category to which each of at least one application that is running in the electronic device belongs;

determining a target category from the category to which each application belongs, wherein the target category is the same as a category of the second application, and the target category comprises one or more applications; and determining an application with a highest preset priority in the one or more applications as the first application.

16. The electronic device according to claim 15, wherein the one or more processors are further configured to perform execution comprising:

when the first application is presented in the first display window according to the preset rule, presenting, in the first display windows, another application that is other than the first application and that is in the at least one application that is running in the electronic device.

17. The electronic device according to claim 13, wherein the second application is presented in the second display window according to a preset rule, wherein a preset priority of the second application is lower than a preset priority of the first application.

18. The electronic device according to claim 17, wherein the one or more processors are further configured to perform execution comprising:

switching the current display interface to a display interface of the second application if an enable signal corresponding to the second application is detected.

19. An electronic device, comprising:

a memory;

one or more processors configured to determine priority values for each of a plurality of applications, and selecting a first application from the plurality of applications based on a first priority value, from the priority values, associated with the first application; and a touchscreen configured to display a graphical user interface, wherein:

the graphical user interface comprises a current display interface, a first display window, and a first application, the current display interface is displayed in response to detected triggering of a user on the touchscreen of the electronic device, in response to a touch pressure value that is generated when a target region of the touchscreen is touched by a touch operation of the user, and when the touch pressure value is greater than a preset threshold, the first display window is displayed over the current display interface, and the first application is presented in the first display window as a first preview of the first application and according to the first priority value, and when detecting a non-enable signal corresponding to the first application, the electronic device is configured to generate a second display window, as a second preview of a second application, over the current display interface, wherein the first display window, presenting the first preview of the first application, and the second display window, presenting the second preview of the second application, are configured for simultaneous display over the current display interface.

20. The electronic device according to claim 19, wherein the second application is presented in the second display window, and a preset priority of the second application is lower than a preset priority of the first application.

* * * * *